United States Patent [19]
Herbert

[11] Patent Number: 6,014,125
[45] Date of Patent: *Jan. 11, 2000

[54] IMAGE PROCESSING APPARATUS INCLUDING HORIZONTAL AND VERTICAL SCALING FOR A COMPUTER DISPLAY

[75] Inventor: Brian K. Herbert, Colorado Springs, Colo.

[73] Assignees: Hyundai Electronics America, San Jose, Calif.; AT&T Global Information Solutions Company, Dayton, Ohio

[*] Notice: This patent is subject to a terminal disclaimer.

[21] Appl. No.: 08/352,401

[22] Filed: Dec. 8, 1994

[51] Int. Cl.$^7$ ........................................................ G09G 5/00
[52] U.S. Cl. ............................. 345/127; 345/439; 345/213
[58] Field of Search .................................... 345/127, 113, 345/114, 115, 118, 119, 120, 122, 213, 185, 189, 201, 501, 507, 508, 513, 439, 509; 395/152, 154, 157, 551, 556, 559, 501, 507, 508, 513, 139

[56] References Cited

U.S. PATENT DOCUMENTS

| | | | |
|---|---|---|---|
| 4,631,600 | 12/1986 | Fukui | 358/320 |
| 4,821,031 | 4/1989 | Roberts | 340/731 |
| 4,916,747 | 4/1990 | Arimoto | 382/47 |
| 4,952,923 | 8/1990 | Tamura | 340/731 |
| 4,994,912 | 2/1991 | Lumelsky et al. | 345/213 |
| 5,027,212 | 6/1991 | Marlton et al. | 348/512 |
| 5,119,082 | 6/1992 | Lumelsky et al. | 340/731 |
| 5,155,595 | 10/1992 | Robison | 348/500 |
| 5,517,612 | 5/1996 | Dwin et al. | 395/501 |
| 5,625,379 | 4/1997 | Reinert et al. | 345/154 |

*Primary Examiner*—Kee M. Tung
*Attorney, Agent, or Firm*—Townsend and Townsend and Crew LLP

[57] ABSTRACT

A scaling apparatus is disclosed for horizontally and vertically scaling scan line information stored in a video memory prior to providing the scan line information to a computer display. Horizontal scaling apparatus is provided in which a first clock signal is provided for graphics portions of scan lines and a second clock signal is provided for video portions of scan lines. The second clock signal is enabled in a manner such that the second clock signal exhibits a predetermined phase relationship with respect to the first clock signal from scan line to scan line. The frequency of the second clock signal is selected to determine the scaling of the video portion of the scan line. Vertical scaling apparatus is provided in which scan line information corresponding to first and second scan lines is retrieved from a video memory. A digital differential analyzer, external to the central processing unit, then determines respective weights for the first and second scan lines dependent on the amount of vertical scaling desired. The weights for the first and second scan lines are then provided to a weighted adder which adds the first and second scan lines according to these weights.

30 Claims, 15 Drawing Sheets

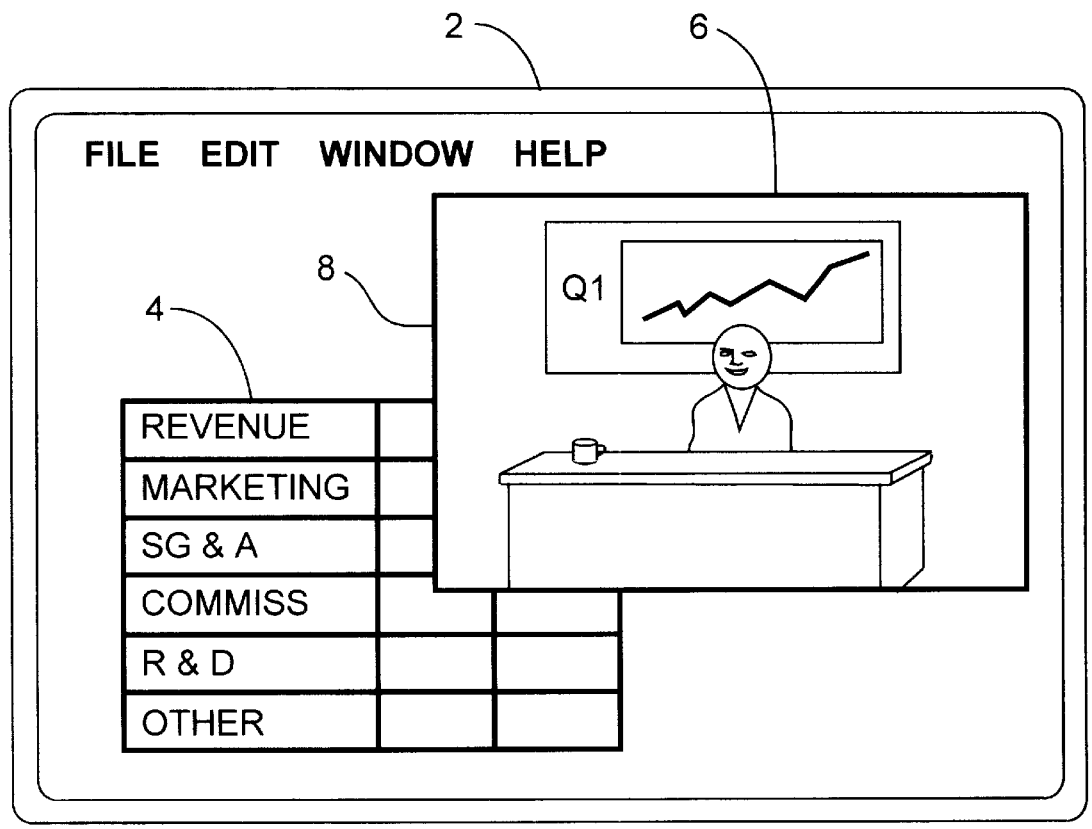
*Fig. 1*
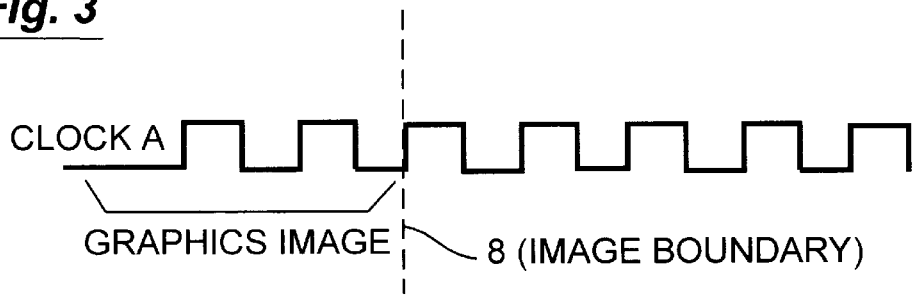
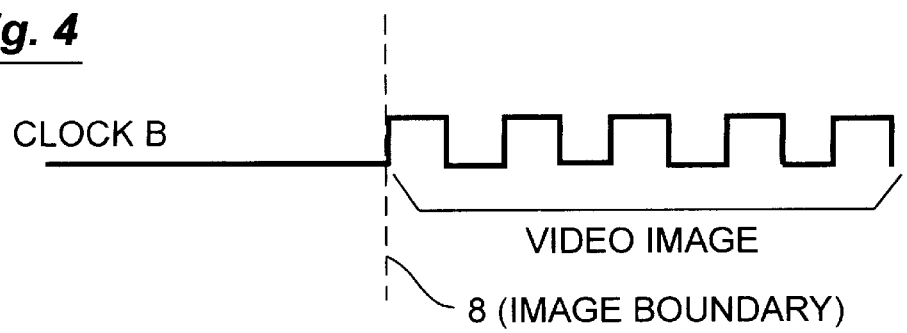

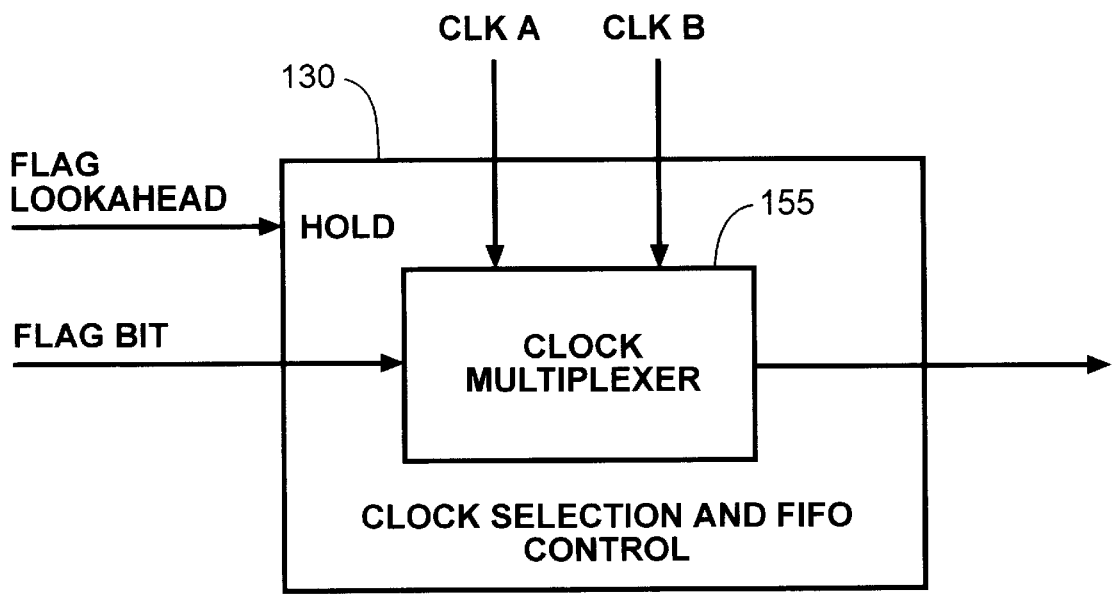
*Fig. 8*
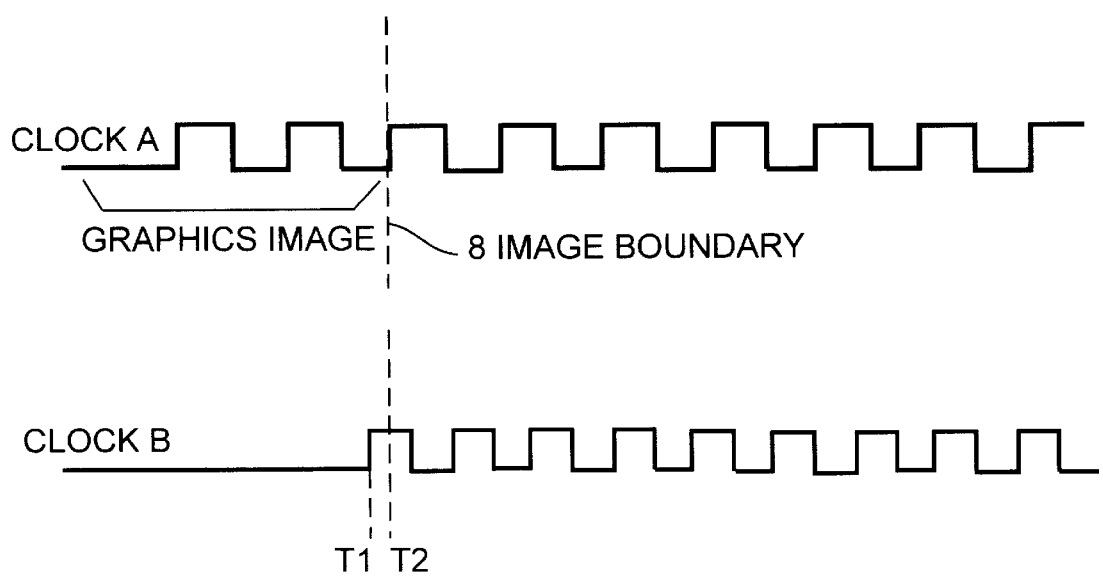
*Fig. 9A*
*Fig. 9B*

Fig. 10A
Fig. 10B
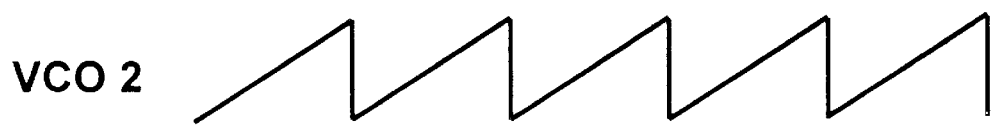
Fig. 10C
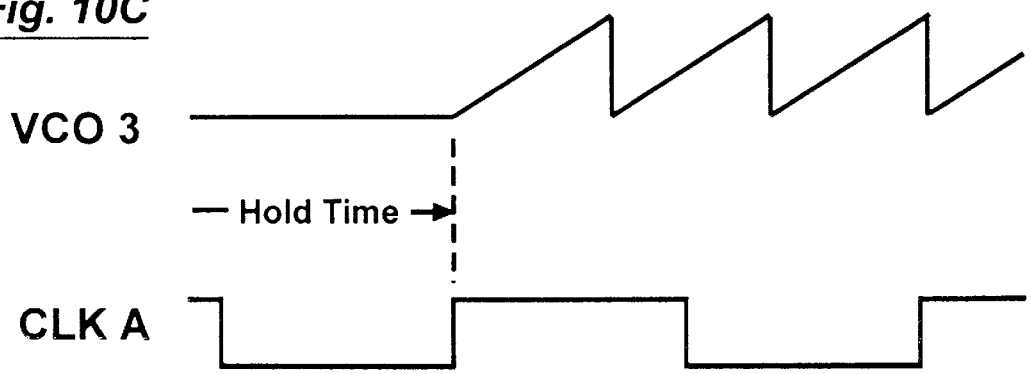
CLK A
Fig. 10D
CLK B
Fig. 10E Pixel Data HSync Blank

Fig. 14

Vertical Scaling and Weighted Average Selection

| Scan Line | Replication | Desired Interpolation | Four Level Weight Interpolation |
|---|---|---|---|
| 1 | 1 | Scan 1 * 1.00 | Scan 1 |
| 2 | 2 | Scan 1 * 0.143 + Scan 2 * 0.857 | Scan 1 * 0.25 + Scan 2 * 0.75 |
| 3 | 3 | Scan 2 * 0.286 + Scan 3 * 0.714 | Scan 2 * 0.25 + Scan 3 * 0.76 |
| 4 | 4 | Scan 3 * 0.429 + Scan 4 * 0.571 | Scan 3 * 0.50 + Scan 4 * 0.50 |
| 5 | 5 | Scan 4 * 0.571 + Scan 5 * 0.429 | Scan 4 * 0.50 + Scan 5 * 0.50 |
| 6 | 6 | Scan 5 * 0.714 + Scan 6 * 0.258 | Scan 5 * 0.75 + Scan 6 * 0.25 |
| 7 | 7 | Scan 6 * 0.857 + Scan 7 * 0.143 | Scan 6 * 0.75 + Scan 7 * 0.25 |
| 8 | 8 | Scan 7 | Scan 7 |
| 9 | 9 | Scan 8 | Scan 8 |
| 10 | 10 | Scan 8 * 0.143 + Scan 9 * 0.857 | Scan 8 * 0.25 + Scan 9 * 0.75 |
| 11 | 11 | Scan 9 * 0.286 + Scan 10 * 0.714 | Scan 9 * 0.25 + Scan 10 * 0.75 |
| 12 | 12 | Scan 10 * 0.429 + Scan 11 * 0.571 | Scan 10 * 0.50 + Scan 11 * 0.50 |

*Fig. 15A*

Two Term Adder

| A | 7 | 6 | 5 | 4 | 3 | 2 | 1 | 0 |
| B | 7 | 6 | 5 | 4 | 3 | 2 | 1 | 0 |
| Sum | 8 | 7 | 6 | 5 | 4 | 3 | 2 | 1 | 0 |
| Result | | 7 | 6 | 5 | 4 | 3 | 2 | 1 | 0 |

*Fig. 15B*

Four Term Adder

| A | | 7 | 6 | 5 | 4 | 3 | 2 | 1 | 0 |
| B | | 7 | 6 | 5 | 4 | 3 | 2 | 1 | 0 |
| C | | 7 | 6 | 5 | 4 | 3 | 2 | 1 | 0 |
| D | | 7 | 6 | 5 | 4 | 3 | 2 | 1 | 0 |
| Sum | 9 | 8 | 7 | 6 | 5 | 4 | 3 | 2 | 1 | 0 |
| Result | | | 7 | 6 | 5 | 4 | 3 | 2 | 1 | 0 |

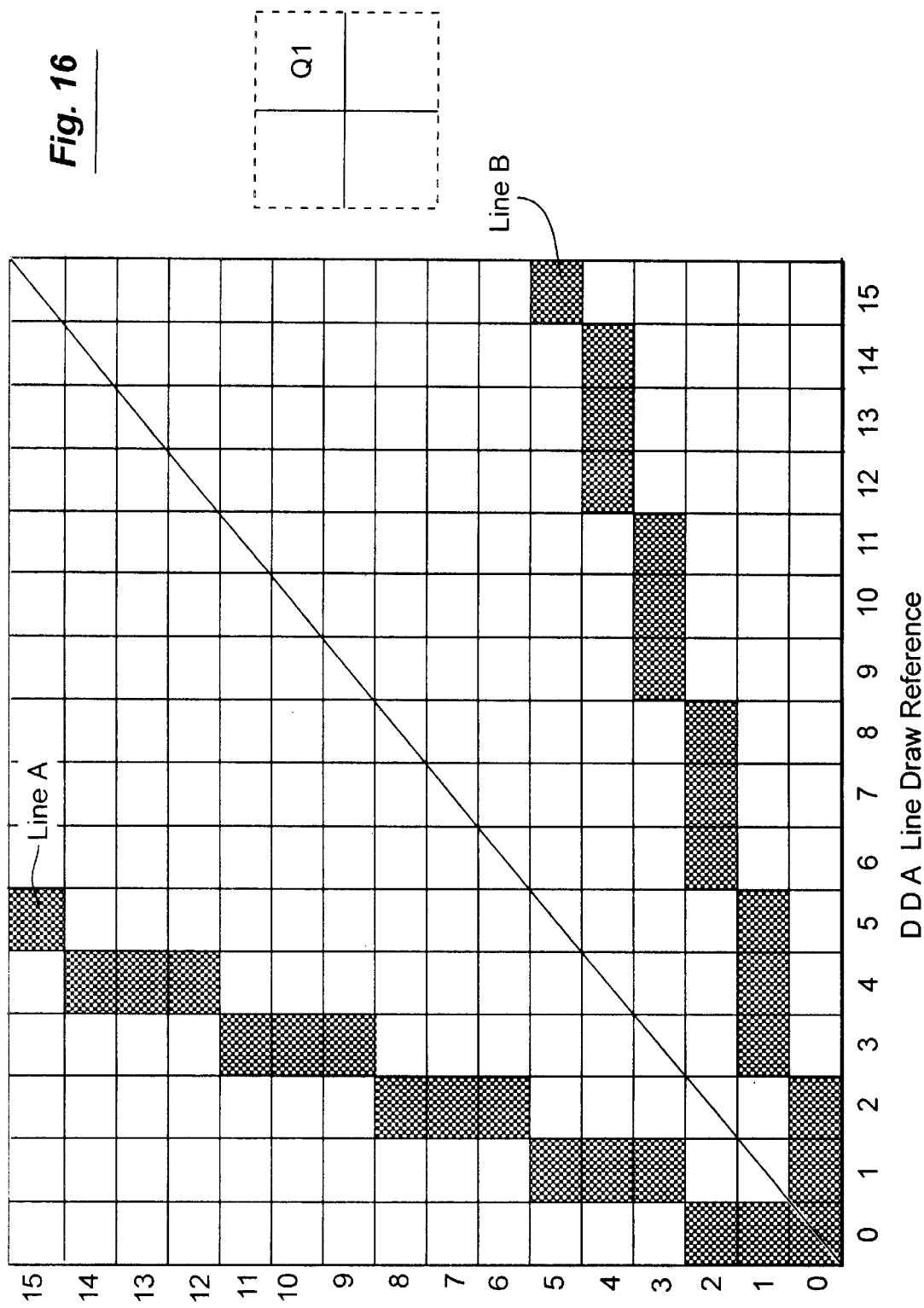

IMAGE PROCESSING APPARATUS INCLUDING HORIZONTAL AND VERTICAL SCALING FOR A COMPUTER DISPLAY

BACKGROUND OF THE INVENTION

This invention relates in general to video image processing and, more particularly, to video image processing in the personal computer environment.

It has become common in the computer display industry to refer to display data such as that generated by a standard graphics adapter (VGA, SVGA, etc.) as "graphics" and for television type display information to be referred to as "video". Graphics images tend to be relatively static with portions being updated at relatively slow rates, whereas video images can have every pixel thereof varying from frame to frame to give the illusion of a continuously varying image or motion picture if desired.

With the advent of multi-media computers, the display of video images on computer displays has become more commonplace. A video image is generally displayed within a window on a portion of the display screen. A situation is now discussed in which a window contains a moving video image (motion video) and the remainder of the screen displays a substantially non-moving image, namely a graphics image. The graphics image typically includes text characters, fixed graphics or another non-moving image.

In order for video to be displayed on computer displays, a display buffer or screen buffer is generally provided to match the moving video image to the display characteristics of the particular computer monitor. Video which is formatted specifically for computer displays typically has a frame rate of 15 to 30 Hz, while computer display systems typically have 60 or 70 Hz refresh rates. This results in the requirement to buffer the video so that the video may be transmitted to the display subsystem once, but may be displayed in more than one frame.

One approach to display buffering is to employ a dedicated memory into which the video image is read and which is then used to paint the video image on the display monitor at the appropriate display format and rates. Another approach to display buffering is to use the display memory of the graphics display system of the computer as a buffer in which to store the moving video image. This approach advantageously conserves memory and reduces the overall cost of memory.

Many graphical environments such as Microsoft Windows and graphical user interface operating systems such as OS/2 (OS/2 is a trademark of the IBM corporation) and Apple Computer's System 7 present information in a window on the display screen. it is also desirable that video images or motion video be displayed in such windows. To accomplish this task, it is often necessary that the data which represents the video image be scaled to fit the window.

Such scaling to make a video image fit a particular size window has typically been accomplished through a stretch block logic transfer (BLT) where pixel values may be interpolated or may be replicated or decimated to convert from the original image size to the desired window size.

Pixel replication or decimation is used for color lookup table display modes since the frame buffer does not contain the specific color of the pixels to be displayed. Pixel replication can result in reduced image quality due to shape distortion. For direct color modes, a weighted interpolation of the RGB components provides superior image quality, but the processing overhead associated with weighted interpolation can be so large that the CPU becomes bogged down, thus delaying other important CPU tasks and increasing the difficulty of real-time or synchronized processing.

Some video display systems scale video images external to the display subsystem controller, resulting in large amounts of data being transferred between the scaler and the display subsystem for enlarged images. Since the enlarged images are transferred at regular intervals for motion video, a large portion of the available memory bandwidth may be consumed by this transfer, thereby limiting the amount of time which may spent drawing graphics images, resulting in lower system performance. When the amount of video data exceeds the ability of the system's processing, the video image will degrade and possibly exhibit tearing and jerky motion.

An example of a graphics image and a video image on the same computer display is shown in FIG. 1. More specifically, FIG. 1 shows a computer screen 2 including a window 4 in which a graphics image such as a spreadsheet is displayed and further includes a window 6 in which a video image is displayed. The two images are overlapped as shown. A display clock is typically used to paint, scan line by scan line, the combined graphics/video image on the display screen.

Conventional graphics controllers used in personal computers often provide block logic transfer (BLT) capabilities. BLT operations are a basic part of many graphical user interfaces (GUIs). Thus, providing high performance BLT capabilities result in high performance graphics. Most BLT graphics controllers desirably operate independently of the CPU of the computer system. This approach of having the graphics controller operate independently from the computer's CPU has a significant positive impact on overall system performance. This is true because the CPU and graphics controller operate simultaneously (or coprocess) data. Moreover, the graphics controller is more closely coupled to display memory than the CPU such that operations controlled by the graphics controller are more efficient than those performed by the CPU. For example, the CPU must incur a bus cycle penalty to gain access to display memory whereas, in contrast, the graphics controller has direct access to display memory. Improved graphics controller performance results in improved overall computer system performance.

However, even with the enhanced graphics performance provided by BLT graphics controllers, image compression or expansion is desirable in certain applications. Unfortunately, implementation of image compression and expansion tends to negatively impact the performance of the computer's CPU when performed by the CPU.

SUMMARY OF THE INVENTION

Accordingly, one object of the present invention is to provide an image display system which reduces the CPU overhead often associated with image scaling.

Another object of the image display system of the present invention is to perform scaling in the video/graphics controller to reduce data transfer among the components of the image display system.

Yet another object of the present invention is to provide video scaling internal to the display subsystem such that video image quality is maintained when large scaled images are displayed. A further object of the present invention is to provide video scaling that is largely independent of the graphics controller drawing engine such that high performance graphics can be produced at the same time that scaled video is displayed.

Still another object of the present invention is to provide a image display. system which avoids screen swimming when a moving video image is displayed in a window which overlays a non-moving image on a computer display screen.

Yet another object of the present invention is to provide a video display subsystem with an image expansion capability.

In accordance with one embodiment of the present invention, an image display subsystem is disclosed for use in a computer system having a central processing unit. The image display subsystem is used to supply image data from video memory to a computer display. The image display subsystem includes a horizontal scaling apparatus having a first generator for generating a first clock signal to clock a graphics portion of a scan line to the computer display. The first clock signal exhibits a first frequency. The horizontal scaling apparatus also includes a second generator for generating a second clock signal to clock a video portion of the scan line to the computer display. The second clock signal exhibits a second frequency and a predetermined phase relationship with respect to the first clock signal from scan line to scan line. The image display subsystem further includes a vertical scaling apparatus having a retrieving circuit, coupled to the video memory, for retrieving scan line information for first and second scan lines from the video memory. The vertical scaling apparatus also includes a determining apparatus for determining, external to the central processing unit, weights for the first and second scan lines dependent on the amount of vertical scaling desired. The vertical scaling apparatus further includes a weighted adder, coupled to the retrieving circuit and the determining apparatus, for weighting and adding the first and second scan lines according to the weights determined by the determining apparatus.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

FIG. 1 is a representation of a display screen including a graphics image and a video image.

FIGS. 3 and 4 show respective clock signals, CLOCK A and CLOCK B, employed in the controller of FIG. 3.

FIG. 8 is a block diagram of the clock selection and FIFO control circuit employed by the system of FIG. 5.

FIG. 9A is a representation of the CLOCK A clock signal employed by the system FIG. 5.

FIG. 9B is a representation of the CLOCK B clock signal employed by the system FIG. 5.

FIG. 10A is a representation of the VCO1 signal of VCO1 of the display controller of FIG. 6.

FIG. 10B is a representation of the VCO2 signal of VCO2 of the display controller of FIG. 6.

FIG. 10C is a representation of the VCO2 signal of VCO2 of the display controller of FIG. 6.

FIG. 10D is a representation of the CLK A clock signal of the display controller of FIG. 6.

FIG. 10E is a representation of the CLK B clock signal of the display controller of FIG. 6.

FIG. 14 is a table of vertical scaling and weighted average selection information.

FIG. 15A is a representation of an example in which adder hardware supports two weightings.

FIG. 15B is a representation of an example in which adder hardware supports four weightings.

FIG. 16 is an example of a line drawn via a digital differential analyzer (DDA).

DETAILED DESCRIPTION OF THE INVENTION

Figure 2:
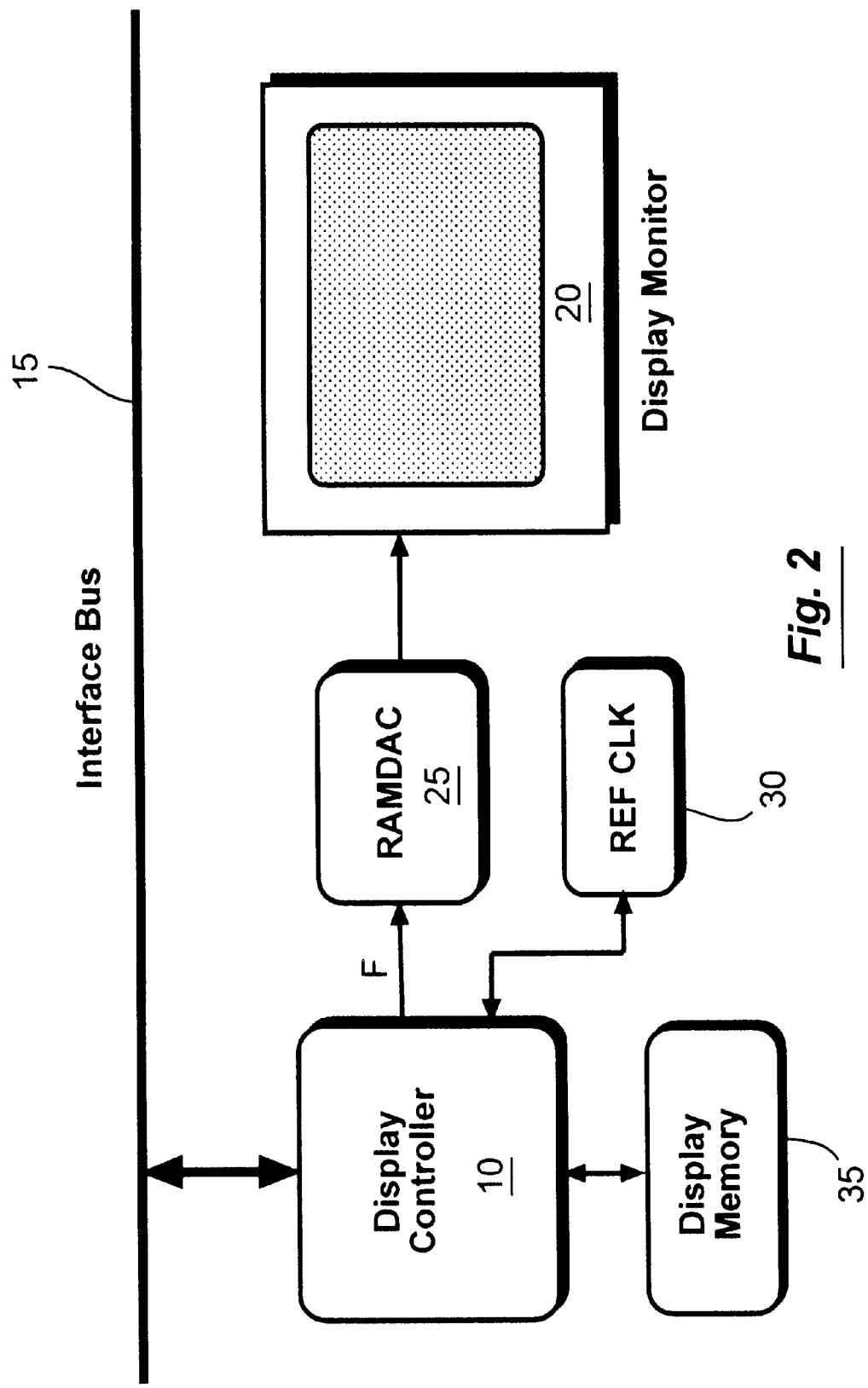
FIG. 2 shows a display subsystem for a computer.

FIG. 2 shows a display subsystem including a display controller 10 which is coupled to an interface bus 15 of a computer. Interface bus 15 may be a Industry Standard Architecture (ISA), Extended Industry Standard Architecture (EISA), MICRO CHANNEL Architecture (Micro Channel is a trademark of IBM Corporation), local bus or other computer input/output (I/O) bus. The display subsystem includes a display monitor 20 for displaying a video image, a graphics image or a combination of both images.

A random access memory digital to analog converter (RAMDAC) 25 is coupled between display controller 10 and monitor 20. RAMDAC 25 performs the function of a color lookup table where pixel values received from display controller 10 are looked up in a RAM based table. This provides palette-based colors and is a "pseudo-color" mode. Alternatively, such pixel values are used to directly control D/A converters for analog red, green and blue outputs. This is a "direct color" mode.

A reference clock 30 which generates a reference frequency signal is coupled to display controller 10. A display memory 35 made from random access memory (RAM) is coupled to display controller 10 as shown in FIG. 2. Display memory 35 stores line by line raster data for the image to be displayed on display monitor 20. The signal, F, generated by display controller 10 is supplied to RAMDAC 25 to control the rate at which a particular scan line is driven out of RAMDAC 25 for display on monitor 20.

The operation of display controller 10 is now explained in more detail with respect to the case where the controller displays a scan line of data which includes information from both a graphics image and a video image.

The graphics display subsystem employs different clock signals for clocking the graphics image 4 and the video image 6 to the display screen. More particularly, as seen in FIG. 3, taking the case of a sample scan line which passes through both the graphics image 4 and the video image 6, a clock signal A (CLOCK A) is used to shift data to the display when the graphics portion of the scan line is being painted to the raster. Conventional computer graphics, such as text, spreadsheets, data bases and other generally non-moving images are painted to the raster at this first clock rate (CLOCK A). However, when the scan line reaches the image boundary 8 at which the moving image or moving video picture begins, then the graphics display subsystem switches to a second clock rate (CLOCK B) as seen in FIG. 4 to shift the data of the moving video image out to the display.

In the above described display scheme, both graphics data and video data are stored in the same frame buffer or display memory. The video data are stored in an area of the display buffer which is separate from the graphics data. This permits the video data to be of a different depth (number of bits per pixel) than the graphics data. The display subsystem permits display data to be fetched from either the graphics area or the video area of the frame buffer. Hardware windowing is thus achieved.

One embodiment of the display subsystem of the present invention advantageously includes the ability to change to an asynchronous clock when switching between the graphics display area and video display area on a scan line by scan line basis. More particularly, it has been found that the start of the video image clock signal (CLOCK B) at image boundary 8 must have a phase relationship to CLOCK A which is repeated for each scan line of the display image in order to avoid undesired jitter.

The display subsystem of the present invention provides a graphics image clock signal CLOCK A and a video image clock signal CLOCK B wherein the phase relationship between these two clock signals at video image boundary 8 remains substantially the same from scan line to scan line. In other words, in accordance with this embodiment of the present invention, the two nonmatching clock frequencies CLOCK A and CLOCK B are phase aligned at a particular point in time to produce a consistent phase difference at the beginning of a window, namely at boundary 8.

Figure 5:
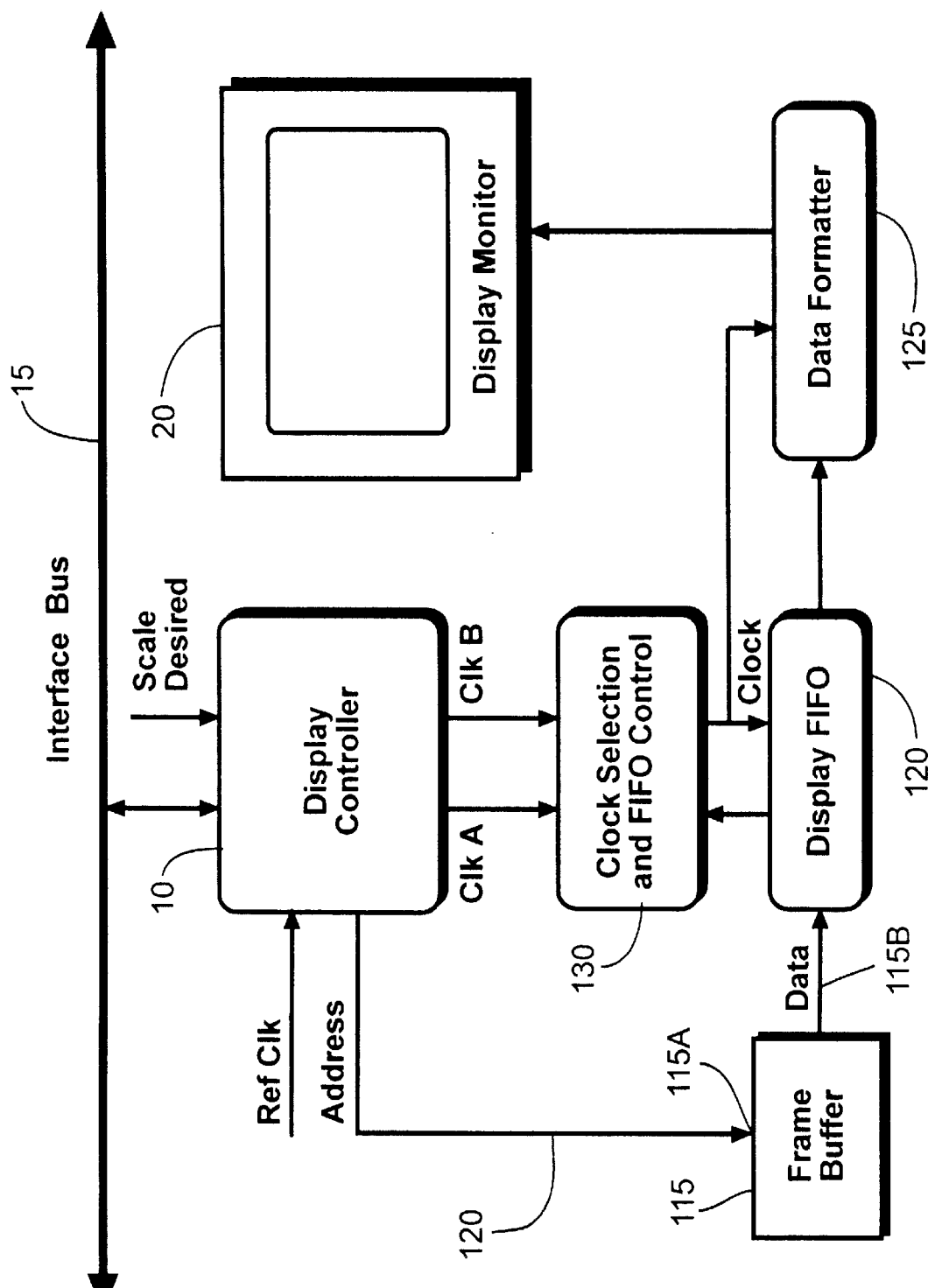
FIG. 5 is a more detailed block diagram of one embodiment of the display subsystem of the invention.

To achieve these operational criteria, a display controller (or CRT controller) 10 with the described capabilities is employed in the display subsystem of FIG. 5. Display controller 10 will be discussed later in more detail with reference to FIG. 6. Returning to FIG. 5, one embodiment of the display subsystem of the invention includes a display controller 10 which is coupled to a computer interface bus 15. The display subsystem includes a video memory or frame buffer 115 which is coupled to display controller 10. Display controller 10 is coupled to input 115A of frame buffer 115 by an address bus 120 to permit display controller 10 to address particular graphics or video data in frame buffer 115 which are to be read out of frame buffer output 115B for display purposes.

The output 115B of frame buffer 115 is coupled to a display FIFO 120. Display FIFO 120 is a first-in, first-out register which temporarily stores data output by frame buffer 115 in response to being addressed by display controller 10. The data stored in FIFO 120 is supplied to data formatter 125 before being transmitted to display 20. As seen in FIG. 5, the output of display FIFO 120 is coupled to the input of data formatter 125. The output of data formatter 125 is coupled to display monitor 20 such that properly formatted data is provided thereto. A clock selection and FIFO control circuit 130 is coupled to both display FIFO 120 and data formatter 125 to control the transmission of data in display FIFO 120 to display 20 as later described in more detail.

Briefly, clock selection and FIFO control circuit 130 determines which clock signal, CLK A for graphics data or CLK B for video data, from display controller 10 is supplied to display FIFO 120 and data formatter 125. The particular clock signal selected, namely CLK A or CLK B, determines the rate at which the corresponding data in display FIFO 120 is output to display monitor 20.

Figure 6:
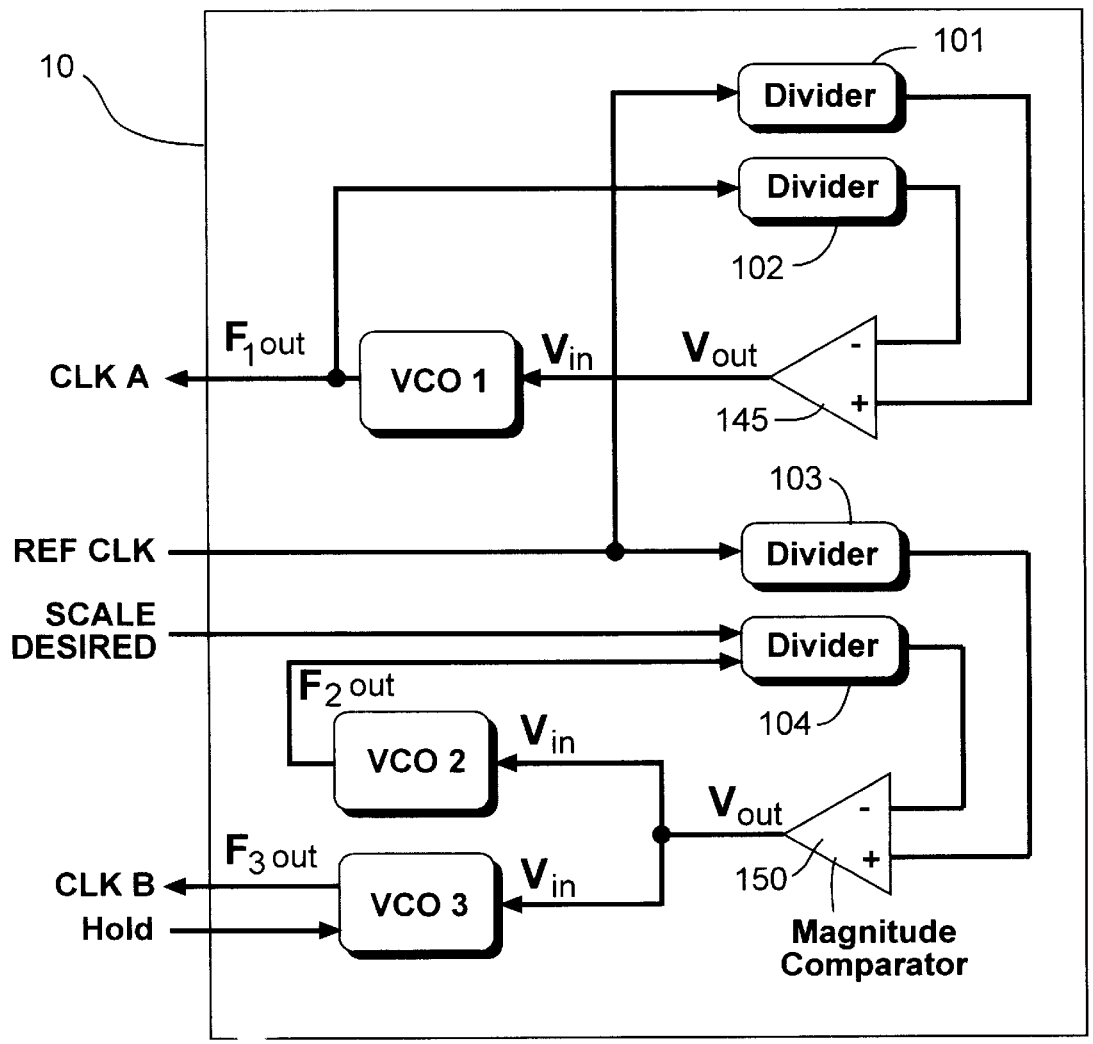
FIG. 6 is a block diagram of the display controller employed by the system of FIG. 5.

FIG. 6 shows one embodiment of a display controller (CRT controller) 10 which is employed in the display subsystem of FIG. 5. Display controller 10 includes CLK A and CLK B outputs which correspond to CLOCK A and CLOCK B clock signals that drive scan line information from display FIFO 120 and data formatter 125 to display monitor 20.

Display controller 10 includes three voltage controlled oscillators (VCO's), namely VCO1, VCO2 and VCO3 as illustrated in FIG. 6. A reference clock input, designated REF CLK is coupled to the input of a divider 101 and a divider 103. A reference clock signal also designated REF CLK is supplied to the REF CLK input and thus to dividers 101 and 103. REF CLK is an externally supplied frequency often exhibiting a value of 14.318 MHz, but not limited to that value.

The outputs of voltage controlled oscillators VCO1, VCO2 and VCO3 generate respective output signals exhibiting frequencies $F_1$out, $F_2$out and $F_3$out. The $F_1$out output of VCO1 is coupled to the input of a divider 102, the output of which is coupled to the inverting input of a magnitude comparator 145. The output of divider 101 is coupled to the non-inverting input of comparator 145.

The $F_2$out output of VCO2 is coupled to the input of a divider 104, the output of which is coupled to the inverting input of a magnitude comparator 150. The output of divider 103 is coupled to the non-inverting input of comparator 120.

In this particular embodiment, divider 101 is a divide by M divider and divider 102 is a divide by N divider. The values of M and N depend on the desired output frequency, $F_1$out, which is used for CLK A to drive the graphics portion of a scan line out of display FIFO 120 and data formatter 125. Assuming a REF CLK value of 14.318 MHz, the values of M and N are given by the relationship:

$$F_1\text{out}=M/N*14.318 \text{ MHz}$$

Dividers 101 and 103 are conveniently implemented as counter circuits.

Divider 103 is a divide by J divider and divider 104 is a divide by K divider. The values of J and K depend on the desired output frequency, $F_3$out, which is used for CLK B to drive the video portion of a scan line out of display FIFO 120 and data formatter 125. Assuming a REF CLK value of 14.318 MHz, the values of J and K are given by the relationship:

$$F_3\text{out}=J/K*14.318 \text{ MHz}$$

Divider 104 is a programmable divider which is coupled to a SCALE DESIRED input of display controller 10. The particular divisor K selected for divider 104 is selected by the SCALE DESIRED input signal provided thereto. In this manner, the particular amount of scaling provided to the video portion of a scan line is varied according to the SCALE DESIRED input signal.

While a SCALE DESIRED input has been shown in FIG. 6 to indicate that the desired horizontal scaling can be input to display controller 10, it should be understood that in actual practice each of dividers 101, 102, 103 and 104 are programmable with scaling information. More particularly, dividers 101, 102, 103 and 104 include respective registers which are programmed with M, N, J and K values which determine the actual amount of horizontal scaling implemented by display controller 10. The output of VCO1 is varied to accommodate different mode formats, such as 640×480 and 1024×768, for example. The output of VCO2 and the subsequent tracked value of VCO3 is used to vary the width of the video window.

Display FIFO 120, which is coupled to display controller 10 as shown in FIG. 5, includes sufficient memory to store data representative of a scan line which is to be displayed on display monitor 20. Controller 10 generates clock frequency output signals CLK A and CLK B which are supplied to display FIFO 120 and data formatter 125 to control the rate at which scan line data is clocked out of display FIFO 120 and data formatter 125 to display monitor 20. The CLK A clock signal corresponds to the $F_1$out output signal of VCO1. The CLK B clock signal corresponds to the $F_3$out signals of VCO3.

Voltage controlled oscillator VCO1, divider 102 and comparator 145 together form a first phase lock loop which generates the CLK A clock signal. The CLK A clock signal is used to clock the transfer of data from display FIFO 120 to display monitor 20 for graphics portions of a display scan line.

Voltage controlled oscillator VCO2, divider 104, and comparator 150 together form a second phase lock loop which is used to generate the frequency desired for the CLK B clock signal. The CLK B clock signal is used to clock the transfer of data from display FIFO 120 to display monitor 20 for video portions of a display scan line. Both VC02 and VC03 receive the same control voltage $V_{in}$ from the output of comparator 150. In other words, VCO3 receives the same control voltage $V_{in}$ as VCO2 and produces the same frequency as VCO2; however, VCO3 can be started and stopped independently (by application of the HOLD signal) such that the phase of VCO3 can be established relative to an external signal, namely CLK A. This ability of the display subsystem of the present invention to produce a repeatable phase when starting VCO3 allows undesired image jitter and swimming to be reduced.

Figure 7:
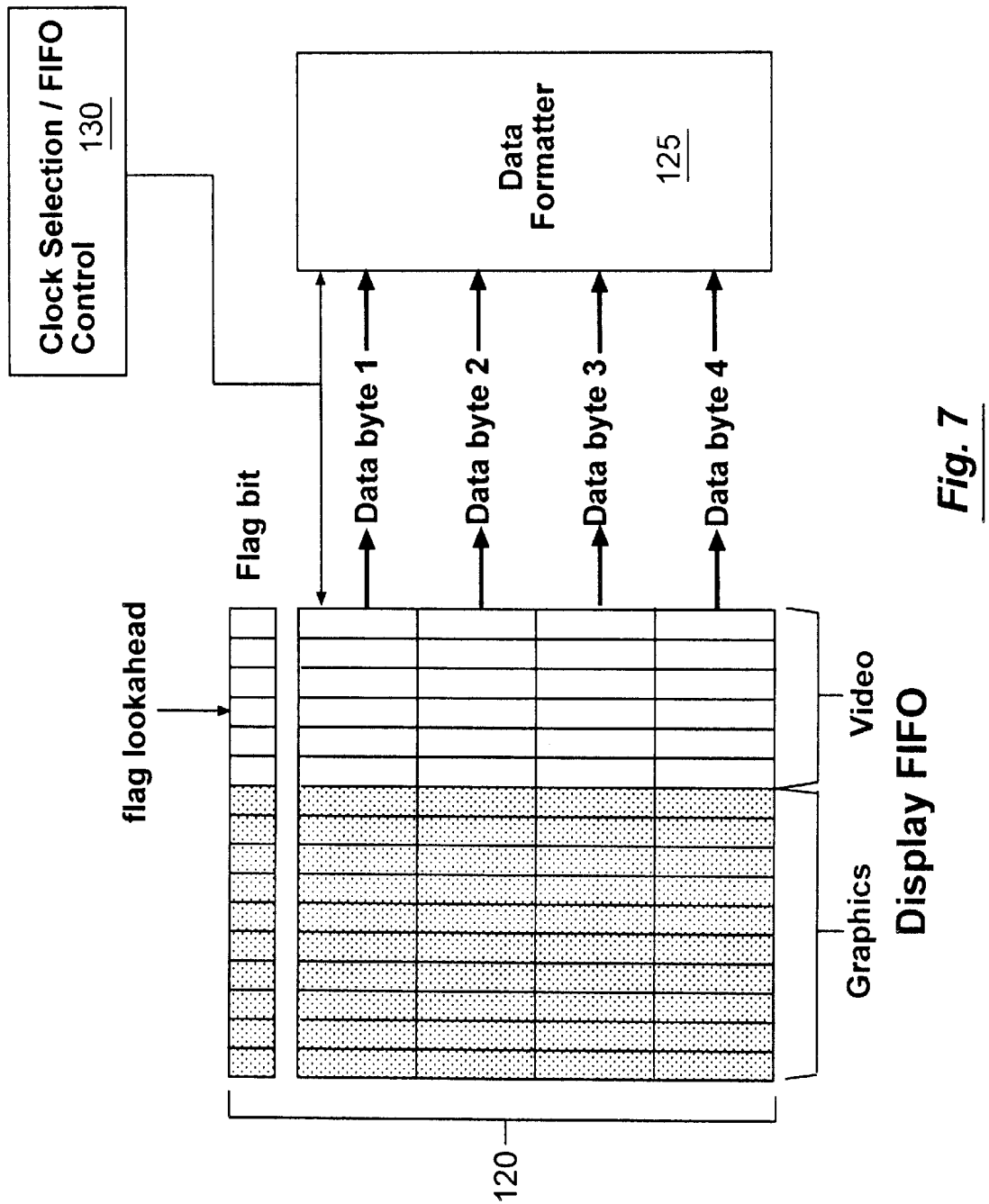
FIG. 7 is a more detailed block diagram of the display FIFO and data formatter of the display system of FIG. 5.

FIG. 7 shows a more detailed block diagram of display FIFO 120, data formatter 125 and clock selection and FIFO control circuit 130. The register which is used to implement display FIFO 120 includes a FLAG BIT which identifies corresponding FIFO data as either graphics data or video data. FIFO 120 is arranged to be able to supply 4 data bytes (data byte 1, data byte 2, data byte 3 and data byte 4) in parallel to data formatter 125 as shown.

FIG. 8 shows a block diagram of the clock selection and FIFO control circuit 130 which selects either CLKA or CLKB from display controller 10 to be passed through to display FIFO 120 and data formatter 125. Clock selection and FIFO control circuit 130 includes a clock multiplexer 155 which selects either CLK A or CLK B to pass through to its output.

More specifically, with reference to the CLK A and CLK B timing diagram samples of FIGS. 9A and 9B, clock multiplexer circuit 155 compares CLK B at the rising edge of CLK A (ie. at time T2) with a delayed version of CLK B which represents the clock state at time T1 such that if the CLK B values at time T1 and T2 are the same, then the clock can be switched to CLK B because a pulse width equal to T2 minus T1 will result. If this condition is not met at the rising edge of CLK A, then CLK A is output until this condition is met and then CLK B is output. In this manner, a pulse sensitive clock multiplexer 155 is provided.

The resultant clock signal at the output of multiplexer 155 is supplied to display FIFO 120 and data formatter 125 to control the clocking of data therein into display monitor 20. A flag bit is also supplied to clock multiplexer 155 to signify which data passing therethrough is graphics data and which data is video data. Flag lookahead information is also supplied to a HOLD input of clock selection and FIFO control circuit 130 as shown.

FIGS. 10A, 10B and 10C show the respective voltage waveforms of the $F_1$out, $F_2$out and $F_3$out frequency signals generated at the output of voltage controlled oscillators VCO1, VCO2 and VCO3. FIG. 10D is a timing diagram of the CLK A clock signal.

The overall operation of the display subsystem of FIG. 5 is now summarized. The display subsystem includes a display controller 10 which includes the already discussed dividers 101–104. These dividers are implemented as counters which are programmed to define the number of pixels and corresponding memory accesses which form the data needed for a horizontal scan line of display data. The display controller 10 also generates monitor timing signals such as blanking and retrace in the conventional manner. It is noted that, in an alternative embodiment, a number of signals common to computer display monitors, namely raster display signals, are useable as control signals to turn off CLK B after active display and then turn it on prior to the start of the next scan line such that it is resynchronized with each scan line.

Figure 11A:
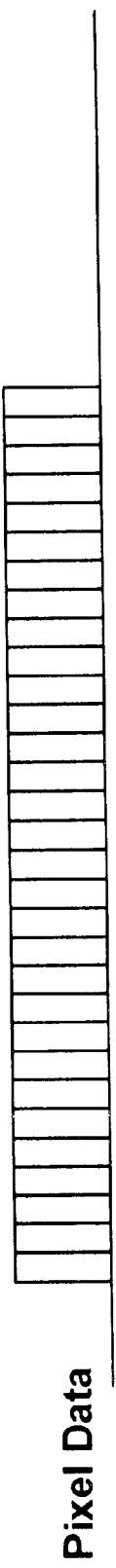
FIG. 11A is a representation of pixel data.
Figure 11B:
FIG. 11B is a representation of an Hsync signal.
Figure 11C:
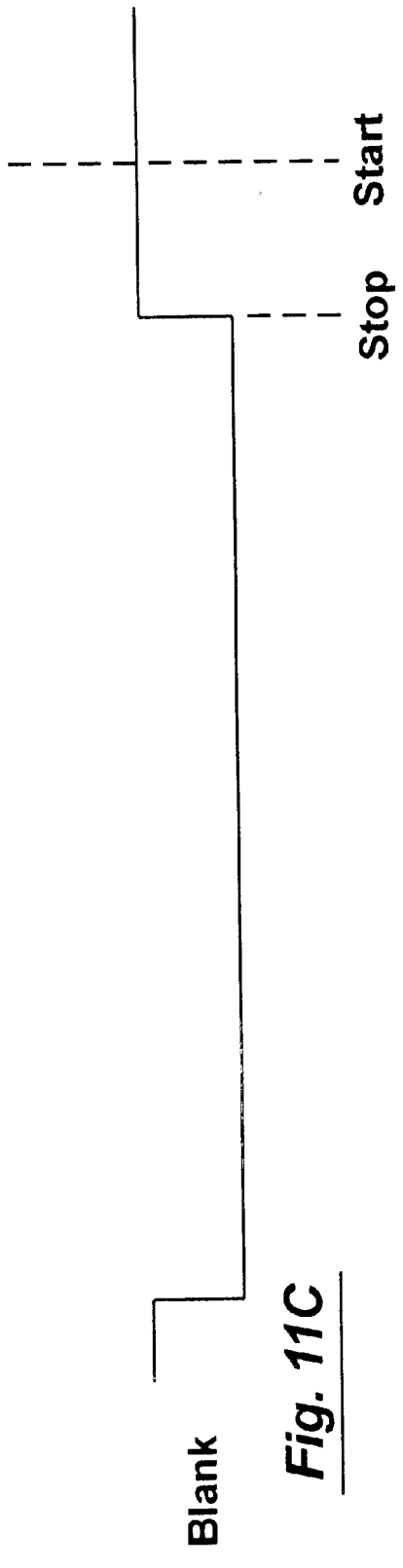
FIG. 11C is a representation of a blanking signal.

For example, refer to FIG. 11A–C for such horizontal sync (HSYNC) and blanking (BLANK) raster display signals. FIG. 11A illustrates 4 bytes (32 bits) of pixel data. FIG. 11B shows the horizontal sync signal. FIG. 11C shows the blanking signal. In this particular example, the rising edge of the blanking signal is used to assert the HOLD signal and the falling edge of HSync is used to start CLK B (ie to turn HOLD off or make it go low). Application of the HOLD signal to VCO3 instructs VCO3 to hold off from outputting the $F_3$out frequency output signal. In other words, when HOLD is high, VCO3 provides no output. However, when HOLD switches from high to low, VCO3 commences output of the CLK B signal. Alternatively, CLK B can be switched in synchronism with the standard VSYNC signal of the display.

Display controller 10 calculates the address in display memory, namely frame buffer 115, from which data is retrieved for the next display position. Data is read from this address in display memory and is stored in display FIFO 120 until it is sent to data formatter 125 and display monitor 20. Display controller 10 also has the ability to perform non-sequential accesses of display memory such that the data sent to display FIFO 120 can jump around between the graphics data area and the video data area of display memory (frame buffer).

Data is read from display memory (frame buffer 115) and stored in display FIFO 120 in display controller 10. This permits data to be read in at a rate which exceeds the rate at which the data is displayed, thus allowing for additional drawing time. Display FIFO 120 includes "full" and "low" level detectors (not shown) which indicate that no more data can be transferred from display memory 115 to display FIFO 120, or that additional data will be needed soon. Display FIFO 120 also contains a flag bit which can be used to indicate cursor position in alphanumeric modes. The flag bit is also used to identify FIFO data as either graphics or video data. As data is being read from the display FIFO and sent to data formatter 125, a lookahead for the flag bit (flag lookahead bit) is used to signal that video data is to be output soon. It is noted that there is some delay between when the data is sent from display FIFO 120 to data formatter 125 and when it is transmitted to display monitor 20. The flag lookahead bit serves as an indicator that clock selection and FIFO control circuit 130 should now start outputting CLK B in preparation for a video window. Likewise, when an upcoming flag bit is detected which specifies graphics data in the pipeline to display monitor 20, clock selection and FIFO control circuit 130 switches back to outputting CLK A at the appropriate position.

The present invention effectively provides three phase lock loop (PLL) generators, corresponding to VCO1, VCO2 and VCO3. The PLL generators corresponding to VCO2 and VCO3 are matched such that one of these PLL generators always operates to establish stable operation while the other is started and stopped as needed. Having two VCO's, namely VCO2 and VCO3, generate the CLK B clock signal permits a repeatable phase relationship to be established in the CLK B clock signal from scan line to scan line. This permits an image free of undesired artifacts such as swimming and jitter to be produced.

In the disclosed display subsystem, VCO2 always runs such that it is stabilized. The feedback voltage $V_{in}$ which is fed to VCO2 is also fed to VCO3 such that VCO3 can be started and stopped without having to "home in" on the feedback voltage.

For example, if VCO2 were stopped, no pulses would be provided to divider 104 such that magnitude comparator 150 would always be driving a high voltage (since the frequency had not been reached). If VCO2 were then started, that VCO would provide a frequency which is too high, resulting in a low voltage from the comparator, reducing the Vin provided to VCO2. After some time, the $V_{in}$ provided to VCO2 will have dropped to the point that the output frequency is too low, and the Vout from the comparator will switch high again. In this process, the VCO2 will home in on the desired output frequency.

By having VCO2 run all the time, and with a long stabilization cycle, a very stable $V_{in}$ can be provided to VCO3 such that it can be started and stopped to produce the desired phase relationship to CLKA, but without the stabilization time associated with starting and stopping VCO2.

In more detail, voltage controlled oscillator VCO1 generates the CLK A signal which is used to clock graphics data whereas matched voltage controlled oscillators VCO2 and VCO3 together generate the CLK B clock signal used to clock the video data. When the graphics portion of a scan line is being transmitted for display, the CLK A clock signal from VCOI is used as the clock signal to provide graphics data to display monitor 20. However, when the video portion of the scan line is encountered, the CLK B clock signal generated by VCO2 and VCO3 is used to clock the video information to the display.

Matched voltage controlled oscillators VCO2 and VCO3 employ a common voltage input such that oscillator VCO2 is used to stabilize the correct feedback voltage for the desired frequency while oscillator VCO3 is held in the inactive state by a HOLD signal until the starting clock position and phase are reached. Oscillator VCO3 is then enabled to run and provides the CLK B clock signal.

To summarize the jitter and swimming reduction feature of this display subsystem, it is noted that matched phase lock loop oscillators (VCO2 and VCO3) are provided in which the feedback control values (ie. the frequency divider numbers, VCO voltages and so forth) for the operating oscillator (VCO2) are also used for an idle oscillator (VCO3) such that the idle oscillator, when started, will begin operating in a stable manner, rather than producing a variable output frequency as the feedback loop stabilizes. The display subsystem also provides scan line by scan line synchronization of an oscillator (CLK B of VCO3 for the video window) which operates at a frequency which is different from the frequency (CLK A of VCO1 for the graphics window) used to produce the screen timing and shifting of the graphics data.

The display subsystem of FIG. 5 also includes a horizontal scaling feature. The horizontal scaling feature is advantageously implemented integrally in the display subsystem itself and, for this reason, the central processing unit of a computer coupled to computer interface bus 15 is not burdened with scaling calculations. As stated earlier, display controller 10 includes a separate clock (CLK B) for displaying video images. The frequency of CLK B is varied according to the amount of horizontal scaling desired for the video window.

In other words, the actual window sizes of the graphics window and the video window are determined by the number of CLK A cycles. However, the amount of information displayed within the window (that is, the scaling the window) is determined by the frequency of clock B. The higher the frequency of CLK B, the more video information is displayed is a predetermined size video window. This corresponds to a more "zoomed out" state. The lower the frequency of CLK B, the less information is displayed in the video window. This corresponds to a more "zoomed in" state. Display controller 10 includes circuitry which increases the CLK B clock frequency when a more zoomed out condition is desired and which decreases the CLK B clock frequency when a more zoomed in condition is desired.

It is noted that the frequency of CLKB is controlled by predetermined values loaded into divider 103 and 104 shown in FIG. 6. These dividers can be accessed by part of the display controller's register set. The divider values loaded therein are generated by software in response to user input (such as sizing of the video window, for example) or alternatively from default values contained within the such software when the video window is first enabled.

To reduce undesired jitter and swimming, it will be recalled from the earlier description that the display controller can phase align the output of VCO3 (also known as CLK B) to CLK A, even though these are two asynchronous events. The clock signal which is used to drive out the display data from display FIFO 120 is reset on a scan line by scan line basis, or at some predetermined number of CLK A periods prior to the start of CLK B.

The width of the video window is selected such that it is sufficiently wide to allow for some tolerance in the frequency of CLKB so that the image will fit the video window even if CLK B is running slower than the desired CLK B clock frequency. Similarly, if CLK B is running faster than the desired CLK B clock frequency by some amount, the display controller is able to duplicate the next FIFO data (typically the window border color) until the intended window boundary time is reached.

In this manner horizontal scaling of the video image within the video window is achieved integrally within display controller 10 without burdening the central processing unit with intensive scaling computations. Overall computer system efficiency is thus enhanced.

The display subsystem of FIG. 5 also includes a vertical scaling feature. Before discussing the vertical scaling feature, it is first noted that interpolation operations or "true zooming" is often used to produce both horizontal and vertical image sizing, Unfortunately, the interpolation approach exhibits the significant disadvantage that the necessary calculations are very complex and consume large amounts of CPU resources. Alternatively, vertical sizing can be produced by repeating one or more scan lines (replication) to achieve image enlargement or by skipping scan lines (decimation) to produce a smaller image. This approach is simpler and requires dramatically less calculation but has the disadvantage that the resultant image is often distorted. This distortion occurs because the resulting scale is not linear with respect to the original image.

Figure 12:
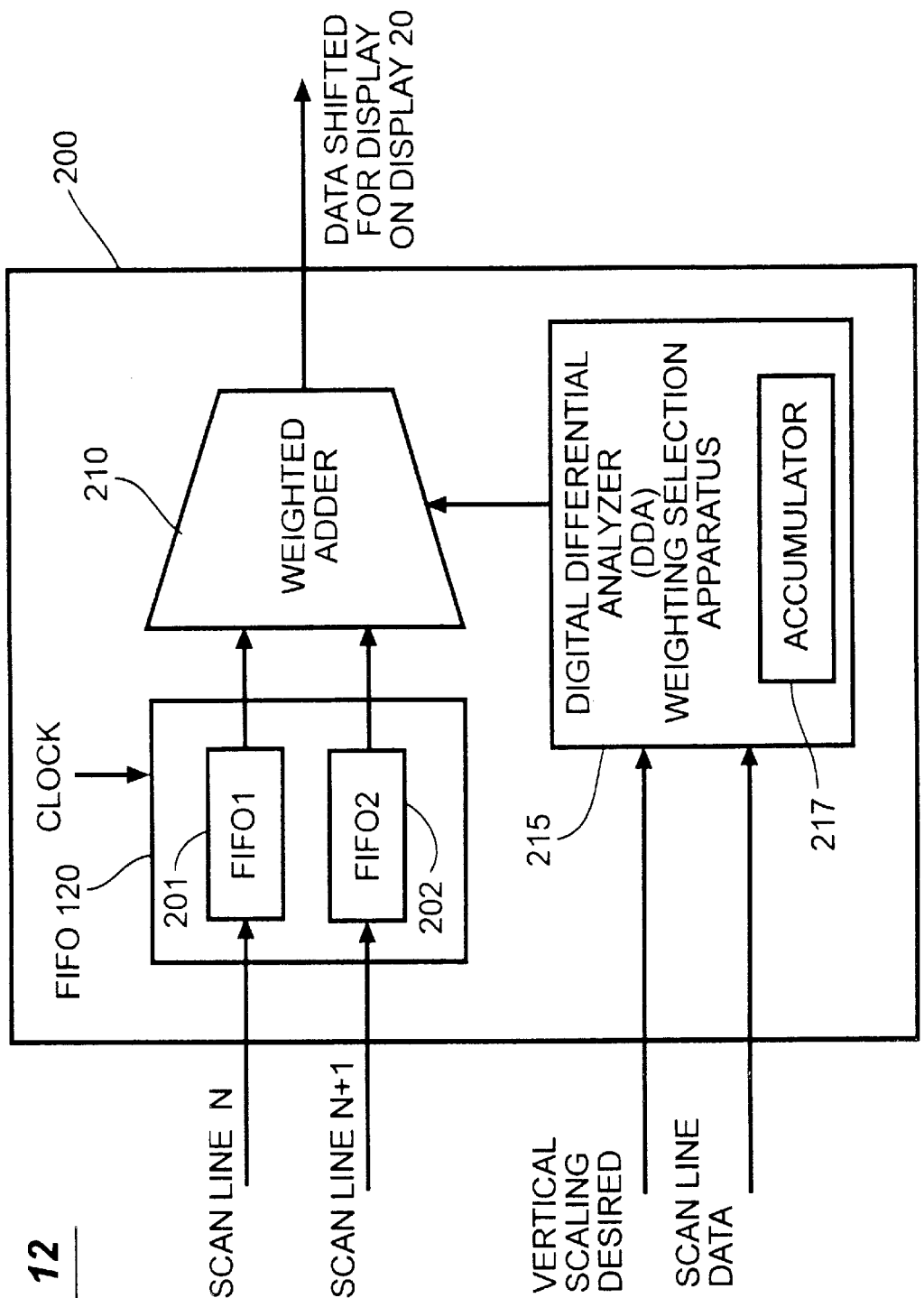
FIG. 12 is a representation of the vertical scaling circuit employed by the display system of FIG. 6.

FIG. 12 shows a vertical scaling circuit 200 for a display subsystem which is used to control the vertical sizing or scaling of the image information provided to display 20. In vertical scaling circuit 200, frame averaging is achieved by combining data representing the same scan line from frame to frame. More specifically, in one example, the present frame being displayed on display 20 includes 80% of the present frame's video data, 15% of the immediately prior frame's video data and 5% of the video data from the frame before that. A three (3) FIFO implementation of vertical scaling circuit 200 can be used in that case.

Vertical scaling circuit 200 of video controller 100 also provides same frame averaging in which display data from two or more scan lines from the same frame are combined to produce the scan line presently being sent to the display 20. This method achieves significantly smoother vertical scaling than the above-mentioned line replication/decimation scheme.

In other words, the vertical scaling circuit 200 can be used for vertical scaling when scan lines from the same image are averaged, or can be used for interframe averaging (no scaling) when data from two separate frames are supplied. With the advent of video formats created for computer systems, namely primarily non-interlaced formats, vertical scaling is the primary application of circuit 200 as opposed to interframe averaging.

One example of circuitry for implementing the disclosed same-frame vertical scaling method is shown in FIG. 12 as vertical sizing circuit 200. Vertical scaling circuit 200 includes a plurality, for example two or three, FIFO (first in first out) shift registers 201, 202, . . . and so forth. These FIFO shift registers 201, 202, . . . together form display FIFO 120 which as shown in FIG. 5 drives display data from frame buffer 115 into display monitor 20.

In this vertical scaling circuit 200, display data is combined in weighted adder 210 prior to being shifted to the display screen. A clock signal, CLOCK, is provided to the FIFO's of FIFO 120 to simultaneously clock out the scan line information in each of the FIFO's to weighted adder 210. Weighted adder 210 is thus simultaneously loaded with scan line information from scan line N and scan line N+1. Since the display data requires no horizontal scaling other than the horizontal scaling via variable data clock as already described, hardware requirements are significantly simpler than "true zooming" or two dimensional interpolation. In this vertical scaling arrangement, vertical scaling is available for the video window as opposed to the whole screen.

As seen in FIG. 12, vertical scaling circuit 200 includes a FIFO1 (designated 201) to which the data from a first scan line (scan line N) of a particular frame is provided. Scan line N is received by FIFO1 from frame buffer 115. Vertical scaling circuit 200 also includes a FIFO2 (designated 202) to which the data from a second scan line (scan line N+1) from the same frame is provided. The outputs of FIFO1 and FIFO2 are coupled to corresponding inputs of a weighted adder 210 to produce a weighted output data signal which is shifted to display 20. The interpolated data generated at the output of weighted adder 210 of FIG. 12 takes the place of the FIFO data generated by display FIFO 120 in FIG. 5.

One manner of calculating the weighting factor employed for weighted adder 210 is now described. The following variables and constants are assumed:

N1=number of scan lines in the original image

N2=number of scan lines is the sized image (scaled image)

L=scan line number from the original image

W1=FIFO1 weighting

W2=FIFO2 weighting

M=scan line of sized image to be presently displayed on display 20

For an enlarged image, if scan line M of the scaled image is to be displayed on display 20, this scan line is produced from scan line L=((N1/N2)*M) of the original image. It has been found to be highly probable that the value for L is a non-integer. This indicates that scan line M includes fractional parts of scan line L and scan line L+1 with the weighting provided by weighted adder 210 being specified by the fractional portion of the calculated value for L.

Since each time the displayed image advances by one scan line, the original image data advances (N1/N2) scan lines, a linear relationship is thereby defined. Calculation of the fractional portion of L is performed by a digital differential analyzer (DDA) in the preferred embodiment of the invention.

However, for images which are to be displayed at a reduced scale, the displayed image is produced from the averaging of two or more scan lines from the original image. If the image size is between 50% and 100% of the original image size, the displayed scan lines are produced from the weighted averaging of two scan lines of the original image. If the displayed image size is less than 50%, but greater than 25% of the original image size, the displayed scan lines are produced from the weighted averaging of three scan lines from the original image. Conventional decimation is employed for images to be displayed at a even smaller scale.

A detailed discussion of the operation of the vertical scaling apparatus and method is now presented. As practiced in the present invention, averaging of two scan lines generally involves averaging the contents of two scan lines from the same frame. In modern computer display systems, most graphics images intended for display are non-interlaced. In contrast, images which are derived from television, ie. moving video images, are usually interlaced and may produce flicker. Averaging of scan lines between two frames can reduce image flicker. It is noted that the averaging method described herein can be used for same frame averaging to achieve vertical image scaling or for inter-frame averaging to reduce flicker. Display data which is first inter-frame averaged can be input to same frame averaging circuitry for vertical image sizing.

In accordance with the method of the invention and as shown in FIG. 12, data from two scan lines are loaded in FIFO1 and FIFO2, respectively. FIFO1 and FIFO2 simultaneously shift data out to weighted adder 210 so that scan line averaging is performed by adder 210 "on the fly" without CPU intervention. The appropriating weighting to be applied by adder 210 is determined and provided to adder 210 by a digital differential analyzer (DDA) 215 which is coupled to adder 210. In one particular embodiment, DDA 215 is used only during video data processing and provides both the weighting for the averaging operation, plus signalling as to which scan lines of data should be loaded into the two FIFO,'s 201 and 202 (or alternated in a single FIFO).

It is noted that for scan line to scan line averaging, the pixels which form the scan line data are represented in a "direct color" format. Direct color format is a format wherein the display data which are stored in video memory or frame buffer 115 directly describe the intensity of the red, green and blue signals used to produce the pixel. Direct color formats have been used in imaging applications for some time and have recently become standard in high performance graphics controllers. The number of bits used to describe each color for some common direct color formats is shown in Table 1 below:

TABLE 1

| FORMAT | RED | GREEN | BLUE |
|---|---|---|---|
| Targa ™ | 5 | 5 | 5 |
| XGA ™ | 5 | 6 | 5 |
| TruColor ™ | 8 | 8 | 8 |

"Direct color" is in contrast to the "pseudo-color" modes or formats employed by many standard IBM-compatible display controllers. In pseudo-color modes, the data stored in display memory serve as an address to a color lookup table. The data stored at that address in the color lookup table is used to control the intensities of red, green and blue for that pixel.

Figure 13:
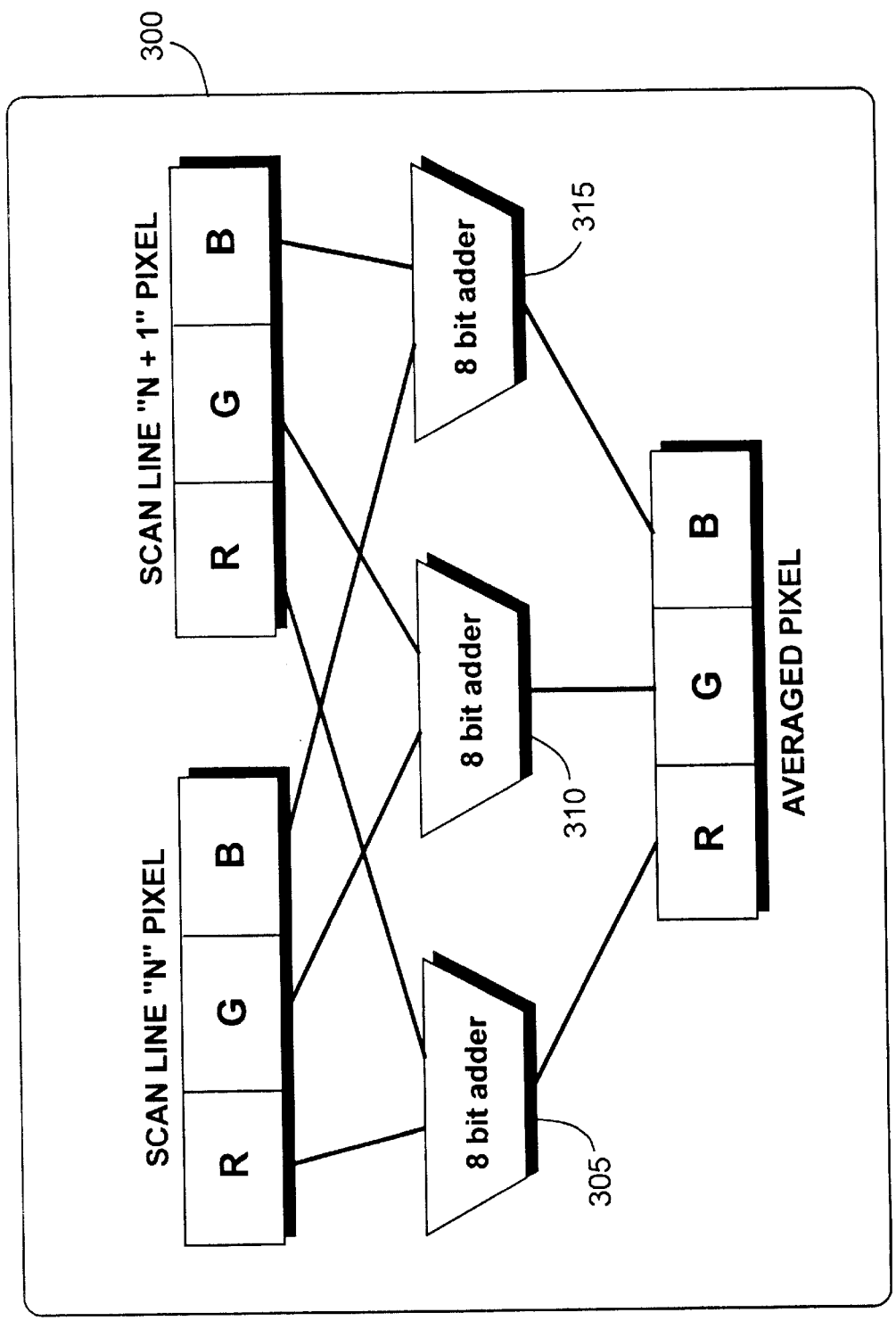
FIG. 13 is a block diagram of an weighted adder arrangement for the 50% averaging case.

In the disclosed technique, scan line averaging takes place via the red, green and blue color components of each pixel. For example, in the case where scan live averaging is applied to the "TruColor" direct color format, if two "Tru-Color" pixels are averaged at 50% each, the red, green, and blue components are added as illustrated in the adder circuit 300 shown in FIG. 13. Three 8-bit adders 305, 310 and 315 are used in adder circuit 300 to achieve 50% averaging between the pixels from scan line N and scan line N+1. While FIG. 13 shows averaging with a weight of 50% for each scan line, it is desirable to have averaging weights which match the desired vertical expansion of the image as provided by the disclosed technique. For example, in the example set forth in FIG. 14, the original image is increased in height (vertically scaled) by an 8/7 ratio. In other words, FIG. 14 shows vertical scaling and weighted averaging selection for an 8/7 vertical scaling ratio.

Since a large number of scaling ratios and resulting average weightings will occur to provide the vast number of vertical scaling ratios which may occur in the course of computer operation, it is often the case that the exact weighting relative to the desired vertical image sizing would not be provided by a fixed or non-weighted adder such as shown in the case of a two term adder of FIG. 15A and a four term adder shown in FIG. 15B. The number of bits available for performing weighted average calculations determines the number of bits of accuracy that are needed from the weight determination circuitry. In the case of FIG. 15A, the adder hardware only supports two weightings. In the case of FIG. 15B, the adder hardware only supports four weightings. In both of these fixed adder cases, it is possible that the exact weighting relative to the image sizing is not supported by the adder hardware.

To avoid these limitations, vertical scaling circuit 200 of FIG. 12 provides digital data analyzer (DDA) circuitry 215 for choosing the most appropriate weighting available in hardware. Typically, this is the weighting which most closely matches that determined by the ratio between the source and resultant images.

Since the available weighted averages do not always exactly match those needed for linear or non-linear interpolation, vertical scaling circuit 200 includes DDA circuitry 215 for selecting which weightings supported by the hardware are used for which scan lines.

When expanding a source image from a predetermined size to a larger displayed image size, there are screen positions where a scan line from the original image (scan line x, for purposes of discussion) is displayed without change and at some position P on the screen. At some position P+n (n is some number of scan lines) above or below that scan line position, the displayed scan line is formulated from scan line x in combination with scan line x+1.

The position at which the displayed scan line changes from original scan line x to a mixture of scan line x and scan line x+1 is determined by the digital differential analyzer (DDA) 215. A DDA is commonly used for line drawing algorithms such as Bresenham's line draw algorithms, for example, and is known to those skilled in the art of computer graphics hardware and software design.

The position at which the screen scan line information changes (from scan line x to a mixture of scan line x and scan line x+1) is a function of the available scan line weighting supported by the particular averaging logic or adder 210, and the relationship in vertical scale between the original image and the displayed image.

It is noted that the DDA architecture can also be used to determine where scan lines should be replicated (or deleted) for pseudo-color modes. For example, from the table of FIG. 14, DDA 215 may be programmed with a 1/7 slope where a step in the Y direction every 7 pixels corresponds to the replication of every 7th scan line.

It is further noted that the weightings to be used when averaging scan lines are determined by the display subsystem such that no intervention from the CPU is required. The manner in which DDA 215 is used to select the weightings for adder 210 is now summarized. When the number of desired weightings exceeds the number of hardware supported weightings, the DDA is programmed to step through the available weightings. For example, in FIG. 14, the four level interpolation shown is controlled by programming DDA 215 for a relative slope of ½ such that for every eight pixels, the DDA steps four times through the available weights. DDA 215 includes an accumulator 217 which is preloaded with a value to allow the offset necessary to advance to the 0.25 weighting on the second term.

The operation of DDA's and the application of DDA 215 for vertical scaling is now described in more detail. Digital differential analyzers (DDA's) are used for line draw functions in graphics hardware and software. A main function of the DDA is carrying out the line draw function (Y=mX +b, wherein m=slope and b is the Y intercept) without performing multiply operations which require complex hardware and typically require long execution times. DDA's are generally configured such that all drawing appears to take place at an angle of 45 degrees or less within the first quadrant. Angles greater than 45 degrees are reached by exchanging X and Y values. Other quadrants are typically drawn by changing the sign of X and Y values.

The operation of DDA 215 involves an accumulator 217 contained therein. If the value in the accumulator is greater than zero, both X and Y values are incremented and the total rise of the line is added to the accumulator and then the total run of the line is subtracted from the accumulator. Unless the line is exactly 45 degrees, at some point the accumulator value will become less than zero. in which case only the X value is incremented, and a value equal to the rise of the line is added to the accumulator. The equations employed by DDA 215 to determine the weightings supplied to weighted adder 210 are set forth in detail in Table 2 below.

TABLE 2

For a line to be drawn from (0,0) to (a,b):
start:
   1) the accumulator (acc) is preloaded with b-a/2.
run:
   If (acc) ≥ 0;
      X = X + 1
      Y = Y + 1
      acc = acc + b
      goto run
   Else
      X = X + 1
      acc = acc − a + b
      goto run In the example drawing of FIG. 16, it is noted that for line B, the Y value increments every third pixel as the line is drawn from 0,0 to 15,5. In this case, the accumulator is preloaded with $5-15/2=-2.5$. (DDA accumulators typically have an extra bit to allow for non-integer values that may rise from the divide by two operation).

It is also noted that in the example of FIG. 16, line A is the same as line B except that X and Y values have been exchanged. The DDA uses this method to accommodate lines with slopes greater than one.

It is further noted that in the disclosed vertical scaling circuit 200, DDA 215 is used to control vertical scaling operations by virtue of selecting the appropriate weightings to be applied to weighted adder 210 for particular input values. The slope of the line (rise over run) represents the scale between the source image and the resultant (scaled) image. When the resultant image is much larger than the source image, this is comparable to lines with large slope values. For example, in FIG. 16, DDA 215 is considered to step along line A, repeating a scan line until the X value increments (providing a 3X increase in size), or can be used to step between various weighting levels available.

The operation of one typical DDA circuit is described in U.S. Pat. No. 2,841,328—Steele et al. In DDA computer circuits, a variable is represented by a train of pulses having a rate proportional to the derivative of the variable. As described by Steele et al., a basic DDA circuit includes three elements, namely a counter which responds to incremental changes, DELTA v, of the integrand to keep track of the current value of the integrand, V, a remainder register which stores the fractional portion of the integral, and an add-subtract circuit that adds the current value of the integrand to the fractional value of the integral in response to a unit change of the variable of integration, DELTA u. The overflow output of the remainder register represents a unit change, DELTA z, of the value of the integral. Neglecting the error due to the value of the remainder, the output rate of the DDA varies in direct proportion to the variable, V, and to the input rate of the variable of integration.

The following is a more detailed discussion of DDA based interpolation as employed by vertical scaling circuit 200. DDA's have been used to specify either where data should be duplicated or dropped (replication or decimation) when palettized color formats (also known as pseudo color formats) are displayed. In accordance with one embodiment of the present invention discussed above, a DDA is provided which interpolates pixel values, rather than just replicating or decimating pixels.

It is helpful to the understanding of general DDA operation to visualize the DDA from the perspective of line drawing. For example, if a line is drawn in the first quadrant from (0,0) to (A,B), then A can be used to represent the number of pixels in the source image and B can be used to represent the number of pixels in the scaled image such that if B>A, then each time Y is increased for the same X, data in the scaled image is repeated. Alternatively, if A<B, then each time X is incremented without an increase in Y, data is dropped from the scaled image.

When the format being used is a direct color format, the weighted average (or mix value) used to produce interpolated pixel values is determined as follows. For example, if a picture is increased in size (scaled up) by B/A, then each source pixel represents 1.33 source destination pixels, in one particular embodiment. In other words,

D1=1.00 S1
   D2=0.33 S1+0.66 S2
   D3=0.66 S2+0.33 S3
   D4=1.00 S3 where D(n) is the scaled destination pixel written and S(n) is the source data from the original picture.

DDA accumulator 217 contains a value which can be decoded to directly specify the desired weighting between some scan line N and scan line N+1 to produce a weighted output image. This is accomplished by the following method.

First, once the desired scale is selected, the scale is reduced to the lowest rational number. For example, a scale of $35/15$ is reduced to $7/3$.

Second, the scale is then divided into a binary number, F, which is greater than or equal to the largest number of pixels that may be drawn in any direction. For example, if the maximum drawable format is 1280×1024, then F would have a value of 2048. The result of the division of the scale into F is designated M.

Third, DDA accumulator 217 is loaded with an initial value of M*(B−(A/2)).

Fourth, when the DDA accumulator value is greater than or equal to zero, the next pixel data from display FIFO 120 is selected for averaging with the previous pixel's data with weighting described by the most significant bits (MSBs) of DDA accumulator 217. These MSBs are latched and a value of M*(B−A) is added to accumulator 217.

However, when the accumulator value is less than zero, the present set of pixel data is averaged using the weighting indicated by the MSBs of the accumulator.

Figure 17:
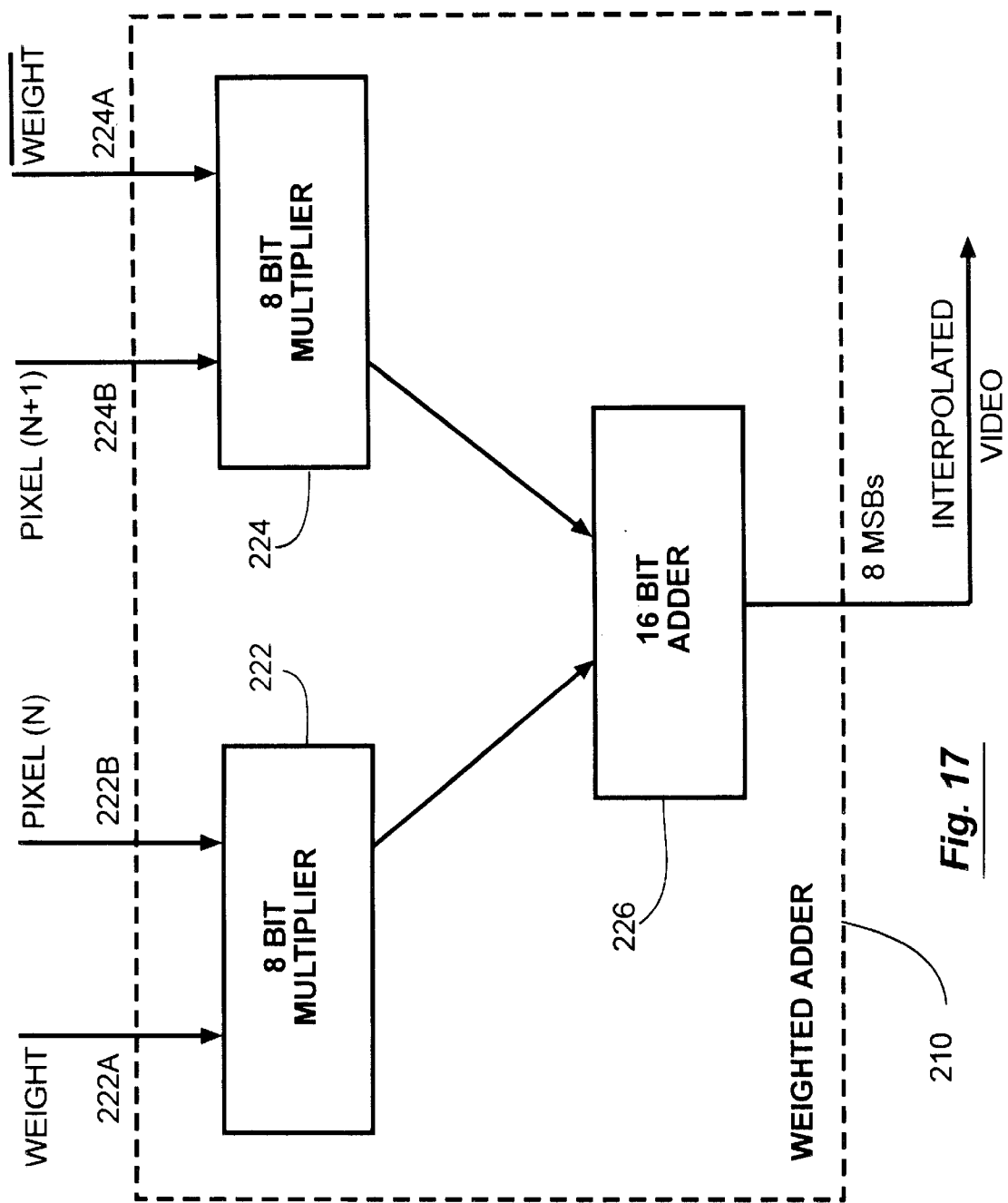
FIG. 17 is a block diagram of a weighted adder circuit employed by the display subsystem.

Fifth, the eight MSBs of the DDA accumulator (hereafter these MSBs are designated W) are used to select the weighting to be used when the 8 bit multiplier architecture of FIG. 17 is used in weighted adder 210 to interpolate pixel values. The particular weighted adder 210 depicted in FIG. 17 includes 8 bit multipliers 222 and 224. Multiplier 222 includes a weight input 222A which is coupled to DDA 215 to receive a weight value, WEIGHT, therefrom. Multiplier 222 includes a further input 222B which is coupled to FIFO 120 to receive a pixel from scan line N.

Multiplier 224 includes a weight input 224A which is coupled to DDA 215 to receive the complement of the weight value, /WEIGHT.

Multiplier 224 also includes an input 224B which is coupled to FIFO 120 to receive a pixel from scan line N+1, such pixel corresponding positionally to the pixel provided to multiplier 222 except advanced by one scan line. After weighting is conducted by multipliers 222 and 224, the resultant weighted outputs of multipliers 222 and 224 are added together by 16 bit adder 226 as shown in FIG. 17.

More particularly, when using 8 bit multipliers for weighted adder 210 as in FIG. 17, two multipliers (222 and 224) are used where the color value (R, G, or B) for pixel N is multiplied by W and the color value for pixel N+1 is multiplied by the complement of W. In FIG. 17, WEIGHT corresponds to W and /WEIGHT corresponds to the complement of W. The results from the two multipliers are added in 16 bit adder 226 and then the 8 MSBs from this addition are output as the weighted average result at the output of weighted adder 210, namely the interpolated value.

When weighted adder architectures other than 8 bit multipliers are used, the MSBs from DDA accumulator 217 may be used to specify multiplication factors for multipliers which have less than 8 bits. For example, if 4 bit multipliers are used (allowing 16 increments in pixel weighting), a 12 bit adder is used as adder 226 and the 8 MSBs from this adder are the interpolated value for the color (R, G or B).

If only a few weightings are supported for pixel averaging, a multiple term adder architecture may be used for weighted adder 210 in place of the multiplier architecture shown in FIG. 17. It will be recalled that with reference to FIG. 15B, such a four term adder was shown and discussed. A system which supported four or eight weightings is now considered. In this case the upper two bits of the accumulator 217 are used to select which of the four weightings to use. Alternatively, if an eight weighting version is employed, the upper three bits of accumulator 217 are used to select the weighting value.

If less than 256 weightings are to be supported, the upper MSBs of accumulator 217 can be used to directly select weightings which are binary decodable, or can be input into a selection table to select non-binary weighting values.

Figure 18:
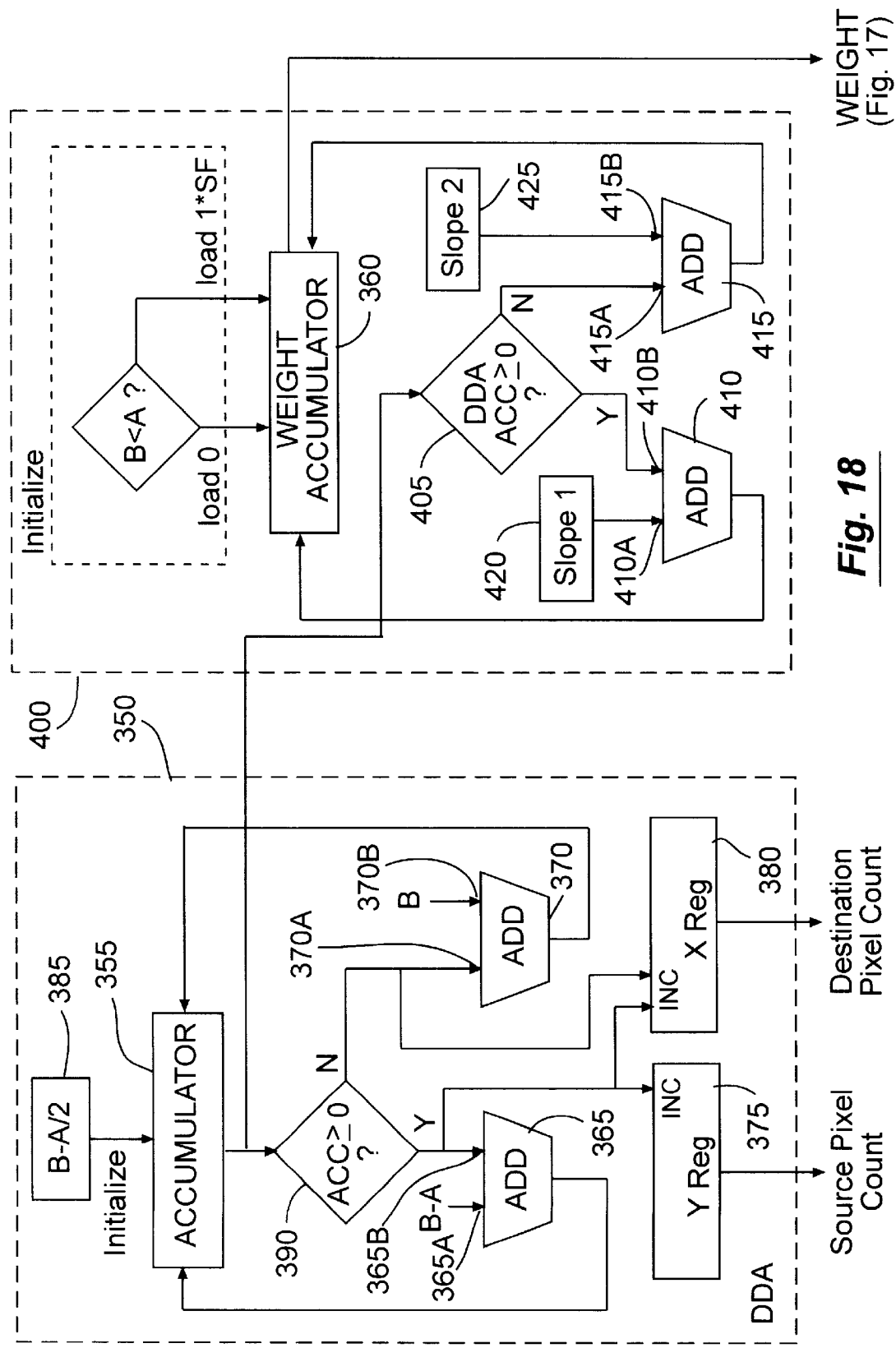
FIG. 18 is a block diagram of a preferred vertical scaling circuit.

FIG. 18 depicts a representation of an alternative embodiment of the DDA circuitry which is employed in vertical scaling circuit 200. This vertical scaling circuit is designated as vertical scaling circuit 200'.

Vertical scaling circuit 200' includes a DDA 350 which performs source and destination scan line selection from the contents of frame buffer 115. DDA 350 includes an accumulator 355 as shown. Vertical scaling circuit 200' further includes a second accumulator 360 which acts as a weight value calculator to determine weighting values for line data averaging.

The DDA used as DDA 350 is typical of that used for Bresenham algorithm line drawing routines. The slope of the line in this instance is analogous to the difference in size between the original (source) and scaled (destination) images. DDA logic provides pointer values to the source and destination scan lines being written and read. These pointer values are designated as "source pixel count" and "destination pixel count" in FIG. 18. The number of bits used in DDA accumulator 355 is typically equal to one plus the number of bits required for binary representation of the maximum number of displayable scan lines.

In addition to accumulator 355, DDA 350 includes addend1 register 365 and addend2 register 370. Addend1 register 365 includes inputs 365A and 365B. Addend2 register 370 includes inputs 370A and 370B. The outputs of addend1 register 365 and addend2 register 370 are coupled back to respective inputs of accumulator 355. DDA 350 further includes Y register 375 and X register 380 which are connected as indicated in FIG. 18. The output of Y register 375 indicates the source pixel count and the output of the X register 380 indicates the destination pixel count. Y register 375 includes an INC or increment input which causes the value stored in Y register 375 to increment by one when such INC input is toggled. X register 380 includes two INC inputs. When either of these INC inputs is toggled, the value stored in X register 380 is incremented by one.

To vertically scale an image using vertical scaling circuit 200', the following steps are employed. If the image is being enlarged, the original image size (in pixels) is assigned to the variable B and the enlarged image size (in pixels) is assigned to variable A. If the image is being reduced by less than a factor of two, the original image size is assigned to variable A and the reduced image size (in pixels) is assigned to variable B.

DDA accumulator 355 is initially loaded with a value of B−A/2 as indicated at 385. Addend1 register 365 is loaded with M*(B−A) and addend2 register 370 is loaded with M*B. The output of accumulator 355 is coupled to a comparator 390 which performs a test to determine if the value, ACC, in accumulator 355 is greater than or equal to 0. If ACC≧0 at the end of a displayed scan line which includes video data, a one is provided to input 365B of addend1 register 365 and to the INC inputs of Y register 375 and X register 380. When this occurs, both Y register 375 and X register 380 are incremented. In other words, when ACC is ≧0 at the end of a displayed scan line including video data, the source and destination scan line counts (ie. source pixel count and destination pixel count) are both incremented. The value in addend1 register 365 is added to accumulator 355.

However, if ACC<0 at the end of a displayed scan line, only the destination scan line count (destination pixel count) in X register 380 is incremented. The value in addend2 register 380 is added to accumulator 355.

Vertical scaling circuit 200' includes a weight value calculator 400 which determines the weight to be applied to weighted adder 210. Weight value calculator 400 includes accumulator 360 to which the "slope" value (ratio between source and destination image sizes) is added each time the destination scan line count (destination pixel count) is incremented. One of two slope values (Slope 1 and Slope 2) is selected depending on the sign of the value in DDA accumulator 355 as monitored by comparator 405. The same comparator or testing circuit can be used as comparator 405 and 390. Weight value calculator 400 includes adders 410 and 415. Adder 410 includes inputs 410A and 410B, of which input 410A is supplied with Slope 1. Adder 415 includes inputs 415A and 415B, of which input 415B is supplied with Slope 2.

As mentioned above, one of two slope values (namely, Slope 1 and Slope 2, which are stored in Slope 1 register 420 and Slope 2 register 425, respectively) is selected depending on the sign of the value in DDA accumulator 355. In this manner, precision errors are corrected which may occur due to slope values which result in repeating decimal values. The number of bits used for accumulator 360 of weight value calculator 400 can vary according to the accuracy desired. In this particular embodiment, a 12 bit accumulator is used for accumulator 360. The upper eight (8) bits of weight value accumulator 360 provide weighting values to the weighted adder 210. Accordingly, the output of accumulator 360 is coupled to the weight input of weighted adder 210 as shown in FIG. 18.

The method employed by weight value calculator 400 to determine the weight to be applied to weighted adder 210 is now summarized below. Accumulator 360 is initialized as indicated in FIG. 18. If B<A, then accumulator 360 is loaded with zero. Otherwise, accumulator 360 is loaded with 1*SF during initialization. If the image ratio is greater than one, which occurs in the case of image enlargement, weight value accumulator 360 is loaded with the value 4095 (all bits set to one). If the image is being reduced, then weight value accumulator 360 is loaded with the ratio between source size and destination size.

The Slope 1 register 420 is loaded with a value equal to 4095*slope, where the slope is the ratio between source and destination image sizes. If the slope is greater than one, then one is subtracted from the slope. The Slope 2 register 425 is loaded with a value equal to the rounding error times the inverse slope, plus the Slope 1 value.

In other words, in the case of scaling to achieve image enlargement, the slope 2 register 425 is loaded with a value equal to:

[((Dest/Source−1)*4095)−(Slope 1)]*(Dest/(Dest−Source))+ Slope 1

However, in the case of scaling to achieve image reduction, the slope 2 register 425 is loaded with a value equal to: [((Source*4095)/Dest)−(Slope 1)]*(Source/Dest)+Slope 1.

In the above relationships, "Source" equals source pixel count (or source scan line count) and "Dest" equals destination pixel count (or destination scan line count). It is noted that for some ratios, Slope 1 and Slope 2 will be equal.

When DDA accumulator 355 is updated at the end of a displayed scan line, then weight value accumulator 360 is updated with Slope 1 if DDA accumulator 355 is negative, or alternatively is updated with Slope 2 if DDA accumulator 355 is not negative. The eight most significant bits (MSB's) at the output of weight value accumulator 360 are then sent to weighted adder 210 as the weight to be applied thereto.

The above described vertical scaling apparatus and methodology advantageously employs a multiple FIFO architecture to achieve vertical scaling. A DDA is employed for determining how to combine data from two or more scan lines to generate a resultant scan line. The multiple FIFO architecture is advantageously employed for both frame to frame averaging to reduce image flicker and same frame averaging to achieve image vertical sizing. The multiple FIFO architecture of the disclosed vertical scaling apparatus also provides time correction when displaying video data at a frame rate which is different from the rate at which such data is received.

While the above description sets forth an apparatus for scaling scan line information, it is clear that a method of scaling scan line information provided to a computer display is also disclosed. More particularly, a method is provided for horizontally scaling scan line information including the step of generating a first clock signal for clocking a graphics portion of a scan line, the first clock signal exhibiting a first frequency. The method also includes the step of generating a second clock signal for clocking a video portion of the scan line, the second clock signal exhibiting a second frequency and a predetermined phase relationship with respect to the first clock signal from scan line to scan line. Another embodiment involves a method for vertically scaling scan line information including the step of retrieving scan line information for first and second scan lines from a video memory. The method also includes the step of determining, external to the central processing unit, weights for the first and second scan lines dependent on the amount of vertical scaling desired. The method further includes the step of adding the first and second scan lines in a weighted adder according to the weights found in the determining step.

In summary, a display subsystem is provided which is capable of horizontal scaling and vertical scaling to fit a predetermined window. Advantageously, both horizontal and vertical scaling are achieved within the display subsystem itself such that CPU performance is not degraded.

While only certain preferred features of the invention have been shown by way of illustration, many modifications and changes will occur to those skilled in the art. It is, therefore, to be understood that the present claims are intended to cover all such modifications and changes which fall within the true spirit of the invention.

What is claimed is:

1. A horizontal scaling apparatus for horizontally scaling a scan line including a graphics portion and a video portion, the apparatus comprising:

a first VCO for generating a first output signal exhibiting a first frequency which is locked in frequency with respect to a reference clock signal;

a second VCO for generating a second output signal exhibiting a second frequency which is locked in frequency with respect to the reference clock signal;

a third VCO for generating a third output signal exhibiting the second frequency of the second VCO, the third VCO and the second VCO sharing common frequency control information, the third VCO being held in a hold state when a HOLD signal is supplied thereto, the third VCO entering an enabled state to output the third output signal when the HOLD signal is removed;

a clock signal selector device, coupled to the first VCO and the third VCO, for clocking a graphics portion of a scan line to a display using the first output signal and for clocking a video portion of the scan line to the display using the third output signal; and scaling devices for selecting the frequency of the second and third output signals according to the amount of scaling desired for the video portion of the scan line.

2. The horizontal scaling apparatus of claim 1 further comprising enabling means, coupled to the third VCO, for enabling the third output signal in synchronism with a raster display timing signal such that the third clock signal exhibits a predetermined phase relationship with respect to the first clock signal from scan line to scan line.

3. The horizontal scaling apparatus of claim 2 wherein the raster display timing signal is the horizontal synchronization signal, HSYNC.

4. The horizontal scaling apparatus of claim 2 wherein the raster display timing signal is the vertical synchronization signal, VSYNC.

5. The horizontal scaling apparatus of claim 2 wherein the raster display timing signal is the blanking signal, BLANK.

6. A vertical scaling apparatus for vertical scaling of scan line information, the scan line information being provided to a display of a computer including a central processing unit, the vertical scaling apparatus comprising:

a video memory;

retrieving means, coupled to the video memory, for retrieving scan line information from a plurality of scan lines from the video memory;

determining means for determining, external to the central processing unit, weights for the plurality of scan lines dependent on the amount of vertical scaling desired; and a weighted adder, coupled to the retrieving means and the determining means, for weighting and adding the plurality of scan lines according to the weights determined by the determining means.

7. The vertical scaling apparatus of claim 6 wherein the video memory is a video frame buffer.

8. The vertical scaling apparatus of claim 6 wherein the determining means is a digital differential analyzer.

9. The vertical scaling apparatus of claim 6 wherein a first scan line and a second scan line are from the same frame.

10. The vertical scaling apparatus of claim 6 wherein a first and second scan lines are formed by pixels represented in a "direct color" format.

11. A vertical scaling apparatus for vertical scaling of scan line information, the scan line information being provided to a display of a computer including a central processing unit, the vertical scaling apparatus comprising:

first and second FIFO registers for storing scan line information corresponding to first and second scan lines, respectively;

a weighted adder coupled to the first and second FIFO registers for adding the scan line information according to a determined weighting, the weighted adder including an output; and a weight determining device coupled to the weighted adder for determining, external to the central processing unit, the determined weighting to be applied to the scan line information from the first and second FIFO registers dependent on the amount of vertical scaling desired, such that vertically scaled display information is produced at the output of the weighted adder;

wherein the first and second FIFO registers simultaneously shift the scan line information in the first and second FIFO registers out to the weighted adder.

12. The vertical scaling apparatus of claim 11 wherein the weight determining device is a digital differential analyzer.

13. The vertical scaling apparatus of claim 11 wherein the first scan line and the second scan line are from the same frame.

14. The vertical scaling apparatus of claim 11 wherein the first and second scan lines are formed by pixels represented in a direct color format.

15. A display scaling apparatus for scaling scan line information, the scan line information being provided to a display of a computer including a central processing unit, the display scaling apparatus comprising:

a video memory;

a horizontal scaling apparatus including:

first generating means for generating a first clock signal to clock a graphics portion of a scan line to the computer display, the first clock signal exhibiting a first frequency; and second generating means for generating a second clock signal to clock a video portion of the scan line to the computer display, the second clock signal exhibiting a second frequency and a predetermined phase relationship with respect to the first clock signal from scan line to scan line;

a vertical scaling apparatus including:

retrieving means, coupled to the video memory, for retrieving scan line information for first and second scan lines from the video memory;

determining means for determining, external to the central processing unit, weights for the first and second scan lines dependent on the amount of vertical scaling desired; and a weighted adder, coupled to the retrieving means and the determining means, for weighting and adding the first and second scan lines according to the weights determined by the determining means.

16. A method of horizontal scaling of a scan line including a graphics portion and a video portion, the method comprising the steps of:

generating with a first VCO a first output signal exhibiting a first frequency which is locked in frequency with respect to a reference clock signal;

generating with a second VCO a second output signal exhibiting a second frequency which is locked in frequency with respect to the reference clock signal;

generating with a third VCO a third output signal exhibiting the second frequency of the second VCO, the third VCO and the second VCO sharing common frequency control information, the third VCO being held in a hold state when a HOLD signal is supplied thereto, the third VCO entering an enabled state to output the third output signal when the HOLD signal is removed;

clocking a graphics portion of a scan line stored in a video memory to a display using the first output signal;

clocking a video portion of a scan line stored in video memory to the display using the third output signal; and selecting the frequency of the second and third output signals according to the amount of scaling desired for the video portion of the scan line.

17. The method of claim 16 further comprising the step of enabling the third output signal in synchronism with a raster display timing signal, such that the third output signal exhibits a predetermined phase relationship with respect to the first output signal from scan line to scan line.

18. The method of claim 17 wherein the raster display timing signal is a horizontal synchronization signal, HSYNC.

19. The method of claim 17 wherein the raster display timing signal is a vertical synchronization signal, VSYNC.

20. The method of claim 17 wherein the raster display timing signal is a blanking signal, BLANK.

21. A method for vertical scaling of scan line information provided to a display of a computer including a central processing unit, the method comprising the steps of:

retrieving scan line information for first and second scan lines from a video memory;

determining, external to the central processing unit, weights for the first and second scan lines dependent on the amount of vertical scaling desired; and adding the first and second scan lines in a weighted adder according to the weights found in the determining step.

22. The method of claim 21 wherein a digital differential analyzer performs the determining step.

23. The method of claim 21 further comprising the step of providing the scaled display information to a display monitor.

24. The method of claim 21 wherein the first scan line and the second scan line are from the same frame.

25. The method of claim 21 wherein pixels which form the first and second scan lines are represented in a "direct color" format.

26. A method for vertical scaling of scan line information provided to a display, the method comprising the steps of:

loading scan line information from first and second scan lines into first and second FIFO registers, respectively;

simultaneously shifting the scan line information in the first and second FIFO registers out to a weighted adder;

determining with a digital differential analyzer the weighting to be applied to the scan line information from the first and second FIFO registers; and adding in the weighted adder the scan line information from the first and second FIFO registers using the weighting found in the determining step, thus producing scaled display information.

27. The method of claim 26 further comprising the step of providing the scaled display information to a display monitor.

28. The method of claim 26 wherein the first scan line and the second scan line are from the same frame.

29. The method of claim 26 wherein pixels which form the first and second scan lines are represented in a direct color format.

30. A method of scaling scan line information provided to a display of a computer including a central processing unit, the method comprising the steps of: horizontally scaling the scan line information by:

generating a first clock signal for clocking a graphics portion of a scan line, the first clock signal exhibiting a first frequency; and generating a second clock signal for clocking a video portion of the scan line, the second clock signal exhibiting a second frequency and a predetermined phase relationship with respect to the first clock signal from scan line to scan line;

vertically scaling the scan line information by:

retrieving scan line information for first and second scan lines from a video memory;

determining, external to the central processing unit, weights for the first and second scan lines dependent on the amount of vertical scaling desired; and adding the first and second scan lines in a weighted adder according to the weights found in the determining step.

* * * * *